(12) United States Patent
Akiyama

(10) Patent No.: US 7,854,519 B2
(45) Date of Patent: Dec. 21, 2010

(54) ILLUMINATING DEVICE AND PROJECTOR THAT INCREASE LIGHT UTILIZATION EFFICIENCY

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 902 days.

(21) Appl. No.: 11/733,577

(22) Filed: Apr. 10, 2007

(65) Prior Publication Data

US 2008/0055903 A1 Mar. 6, 2008

(30) Foreign Application Priority Data

Apr. 27, 2006 (JP) .............................. 2006-123039

(51) Int. Cl.
*G03B 21/28* (2006.01)
*G03B 21/26* (2006.01)
*G03B 21/14* (2006.01)

(52) U.S. Cl. .............................. 353/99; 353/94; 353/20
(58) Field of Classification Search .................. 353/94, 353/38, 20, 98, 99; 349/67; 362/234, 235, 362/241, 247
See application file for complete search history.

(56) References Cited

U.S. PATENT DOCUMENTS

| | | | | |
|---|---|---|---|---|
| 6,108,132 A | * | 8/2000 | Itoh | ............................. 359/487 |
| 6,488,379 B2 | * | 12/2002 | Kane | ............................. 353/94 |
| 7,036,941 B2 | | 5/2006 | Akiyama et al. | |
| 7,052,139 B2 | | 5/2006 | Akiyama | |
| 7,125,120 B2 | | 10/2006 | Aruga | |
| 7,185,985 B2 | | 3/2007 | Hanano | |
| 7,303,283 B2 | * | 12/2007 | Yatsu | ............................. 353/20 |
| 7,350,924 B2 | | 4/2008 | Hanano | |
| 7,628,494 B2 | * | 12/2009 | Akiyama | ............................. 353/94 |
| 2005/0128440 A1 | | 6/2005 | Akiyama | |

FOREIGN PATENT DOCUMENTS

| | | |
|---|---|---|
| CN | 1577049 A | 2/2005 |
| CN | 1735832 A | 2/2006 |
| JP | A-2000-347589 | 12/2000 |
| JP | A-2004-102132 | 4/2004 |
| JP | A-2005-148476 | 6/2005 |
| JP | A-2005-197208 | 7/2005 |
| JP | A-2005-268155 | 9/2005 |
| JP | 2005-346109 | * 12/2005 |
| JP | A 2005-346109 | 12/2005 |
| WO | WO 2005/019928 A1 | 3/2005 |

* cited by examiner

*Primary Examiner*—Que T Le
*Assistant Examiner*—Pascal M Bui-Pho
(74) *Attorney, Agent, or Firm*—Oliff & Berridge, PLC

(57) ABSTRACT

An illuminating device includes a first light source unit emitting illumination beams with a first optical axis; a second light source unit; and two reflecting elements arranged on both sides of an optical path of the first light source unit. The reflecting element arranged on the side of the second light source unit reflects the illumination beams emitted from a substantially half region on one side in an aperture plane of the parabolic reflector of the second light source unit, towards the direction along the first optical axis. The reflecting element arranged opposite to the second light source unit reflects the illumination beams emitted from a substantially half region on the other side in the aperture plane of the parabolic reflector of the second light source unit, towards the direction along the first optical axis.

7 Claims, 8 Drawing Sheets

ILLUMINATING DEVICE AND PROJECTOR THAT INCREASE LIGHT UTILIZATION EFFICIENCY

BACKGROUND

1. Technical Field

The present invention relates to an illuminating device and a projector.

2. Related Art

In recent years, high-luminance and compact projector are needed. In order to meet the needs, a projector (so-called two-light-type projector) using an illuminating device having a pair of light source units which are arranged such that the emission directions of illumination beams become mutually different directions, and two reflecting elements which reflect the illumination beams emitted from one light source unit, among the illumination beams emitted from the pair of light source units, towards the same direction as the emission direction of the illumination beams emitted from the other light source unit is suggested (for example, refer to JP-A-2005-346109).

According to such a two-light-type projector in the related art, since the pair of light source units are used, a high-luminance projector can be configured. In addition, in an illuminating device (hereinafter referred to as "illuminating device in the related art") used for the two-light-type projector in the related art, only the illumination beams (hereinafter referred to as "central illumination beams") emitted from a region within a certain range including the optical axis of a light source unit, among the illumination beams emitted from the light source unit, are utilized as illumination light, and the illumination beams (hereinafter referred to as "peripheral illumination beams") emitted from a region out of the certain range are not utilized as illumination light. However, the in-plane light intensity distribution of the illumination beams emitted from the light source unit becomes a distribution having a characteristic curve showing a steep peak in the optical axis of the light source unit and in the vicinity thereof and showing a sharp decline as it goes away from the optical axis of the light source unit. Therefore, even if the peripheral illumination beams in the light source unit are not utilized as illumination light, a sufficiently high-luminance projector is obtained.

Moreover, according to the two-light-type projector in the related art, the pair of light source units are not arranged in parallel such that all the emission directions of illumination beams become the same direction, but the pair of light source units are arranged such that the emission directions of illumination beams become mutually different directions and the emission directions of the illumination beams emitted from the pair of light source units are aligned with one direction by using two reflecting elements. Therefore, a high-luminance and compact projector can be configured.

Meanwhile, in the two-light-type projector in the related art, there is a demand to further enhance the light utilization efficiency in an illuminating device. If the light utilization efficiency in an illuminating device can be enhanced further, not only the luminance of a projector can be increased, but also the stray light level in an illuminating device is reduced so that the image quality of a projection image can be improved. Moreover, generation of unnecessary heat resulting from stray light, etc. can be suppressed, and the heat-radiating structure can also be simplified.

SUMMARY

An advantage of some aspects of the invention is that it provides a high-luminance and compact illuminating device and a projector capable of making light utilization efficiency higher than before.

According to a first aspect of the invention, there is provided an illuminating device including a first light source unit emitting illumination beams with a first optical axis as a central axis, a second light source unit emitting illumination beams with a second optical axis as a central axis, two reflecting elements and an integrator optical system. The first light source unit has an ellipsoidal reflector, a first light-emitting tube having an emission center in the vicinity of a first focal point of the ellipsoidal reflector, a first reflecting section reflecting the light, which is emitted towards an illuminated region from the first light-emitting tube, towards the first light-emitting tube, and a concave lens emitting the converging light from the ellipsoidal reflector as substantially parallel beams. The second light source unit has a parabolic reflector, a second light-emitting tube having an emission center in the vicinity of a focal point of the parabolic reflector, and a second reflecting section reflecting the light, which is emitted towards the illuminated region from the second light-emitting tube, towards the second light-emitting tube. The reflecting elements are arranged on both sides of an optical path of the illumination beams from the first light source unit so as to transmit the illumination beams from the first light source unit as they are without reflecting them and so as to reflect the illumination beams from the second light source unit towards a direction along the first optical axis. The integrator optical system has a function to convert the illumination beams from the first light source unit and the illumination beams emitted from the second light source unit and reflected by the two reflecting elements into light having more uniform intensity distribution. Here, the reflecting element of the two reflecting elements arranged on the side of the second light source unit reflects the illumination beams emitted from a substantially half region on one side in an aperture plane of the parabolic reflector, among the illumination beams emitted from the second light source unit, towards the direction along the first optical axis. The reflecting element of the two reflecting elements arranged opposite to the second light source unit reflects the illumination beams emitted from a substantially half region on the other side in the aperture plane of the parabolic reflector, among the illumination beams emitted from the second light source unit, towards the direction along the first optical axis.

For this reason, according to the illuminating device of the aspect of the invention, the two reflecting elements are arranged on both sides of the optical path of the illumination beams from the first light source unit such that they do not reflect the illumination beams from the first light source unit, but allow the illumination beams to pass therethrough as they are. Therefore, as for the first light source unit, it is possible to utilize not only central illumination beams in the light source unit, but peripheral illumination beams which are not utilized in the related art as illumination light. Moreover, each of the two reflecting elements is arranged such that it reflects the illumination beams emitted from a substantially half region on one side in an aperture plane of the parabolic reflector of the second light source unit and the illumination beams emitted from a substantially half region on the other side in the aperture plane. Therefore, as for the second light source unit, it is possible to utilize not only central illumination beams in the light source unit, but peripheral illumination beams which are not utilized in the related art as illumination light. That is, according to the illuminating device of the aspect of the invention, as for both the first light source unit and the second light source unit, it is possible to utilize both the central illumination beams and peripheral illumination beams in the light source units. Therefore, high luminance can be attained, and the light utilization efficiency can be made higher than before.

Moreover, according to the illuminating device of the aspect of the invention, the first light source unit and the second light source unit are arranged such that the emission directions of illumination beams become mutually different directions, and the emission directions of the illumination beams emitted from the first light source unit and the second light source unit are aligned in one direction by using the two reflecting elements. Therefore, a compact illuminating device can be configured.

In addition, in the illuminating device of the aspect of the invention, it is necessary to use larger reflecting elements than reflecting elements of an illuminating device in the related art because both the central illumination beams and peripheral illumination beams in the second light source unit is utilized. However, according to the illuminating device of the aspect of the invention, a light source unit composed of an ellipsoidal reflector and a concave lens is used as the first light source unit. Therefore, the diameter of the illumination beams emitted from the first light source unit can be made comparatively small. That is, since the distance between the two reflecting elements can be shortened comparatively, even if the size of the reflecting elements becomes larger than before, it is possible to maintain a compact illuminating device as the whole illuminating device.

Moreover, according to the illuminating device of the aspect of the invention, the above-mentioned first reflecting section is provided in the first light-emitting tube, and the above-mentioned second reflecting section is provided in the second light-emitting tube. Therefore, the ellipsoidal reflector and the parabolic reflector can be miniaturized without requiring setting the size of the ellipsoidal reflector and the parabolic reflector to such a size that even the ends of the first light-emitting tube and second light-emitting tube on the side of the illuminated region are covered. As a result, it is possible to realize a compact illuminating device. Moreover, the ellipsoidal reflector and the parabolic reflector can be miniaturized. Accordingly, since the size of the integrator optical system arranged at the latter stage of the optical path can be made small, a more compact illuminating device can be obtained.

Accordingly, the illuminating device of the aspect of the invention becomes a high-luminance and compact illuminating device capable of making the light utilization efficiency higher than before.

Moreover, in the illuminating device of the aspect of the invention, a light source unit composed of an ellipsoidal reflector and a concave lens is used as the first light source unit, and a light source unit composed of a parabolic reflector is used as the second light source unit. Therefore, the illuminating device has the following effects.

That is, in the illuminating device of the aspect of the invention, the illumination beams emitted from the first light source unit will pass through the central region of the integrator optical system. In this case, according to the illuminating device of the aspect of the invention, a light source unit (for example, refer to the pamphlet of International Publication No. 2005-19928) composed of an ellipsoidal reflector and a concave lens and capable of eliminating a region (region where the in-plane light intensity distribution is extremely small) of a shadow in a central portion of illumination beams, which is produced by a light-emitting tube and a reflecting section, is used as the first light source unit. Therefore, it is possible to keep the in-plane light intensity distribution in an illuminated region from becoming nonuniform due to existence of a region of a shadow in a central portion of illumination beams, which is provided by a light-emitting tube and a reflecting section.

Moreover, according to the illuminating device of the aspect of the invention, a light source unit composed of a parabolic reflector having a high parallelism of illumination beams is used as the second light source unit. Therefore, it is possible to keep the in-plane light intensity distribution in an illuminated region from becoming nonuniform due to a difference in the distance from the second light source unit to each of the reflecting elements (the reflecting element arranged on the side of the second light source unit and the reflecting element arranged opposite to the second light source unit).

In the illuminating device of the aspect of the invention, preferably, a translucent member is arranged in the optical path of the illumination beams from the first light source unit between the two reflecting elements.

By configuration the illuminating device in this way, the refractive index of a medium constituting the translucent member is larger than the refractive index of air. Therefore, it is possible to make the length of the optical path of the illumination beams passing through the translucent member comparatively short. As a result, it is possible to make the illuminating device more compact.

In the illuminating device of the aspect of the invention, preferably, the two reflecting elements are reflecting prisms or reflecting mirrors.

In addition, in the illuminating device of the aspect of the invention, both the reflecting prisms and the reflecting mirrors can be used as the reflecting elements. However, the reflecting prisms are used more preferably. In this case, since the refractive index of a medium constituting the reflecting prisms is larger than the refractive index of air, it is possible to make the length of the optical path of the illumination beams passing through the reflecting prisms comparatively short. As a result, it is possible to make the illuminating device more compact.

In the illuminating device of the aspect of the invention, wherein the integrator optical system has a condensing lens which converts into converging light the illumination beams emitted from the first light source unit and the illumination beams emitted from the second light source unit and reflected by the two reflecting elements and emits the converted light, and an integrator rod which converts the illumination beams from the condensing lens into light having more uniform intensity distribution.

By configuring the illuminating device in this way, the in-plane light intensity distribution of illumination beams can be made more uniform by the action of the integrator rod.

In the illuminating device of the aspect of the invention, the integrator rod may be a hollow integrator rod, and may be a solid integrator rod.

As the hollow integrator rod, for example, a tubular light tunnel in which four reflecting mirrors are pasted together with their reflecting surfaces turned towards the inside can be used suitably. Moreover, as the solid integrator rod, an inner surface total reflection type solid rod member (glass rod), etc. can be used suitably.

In the illuminating device of the aspect of the invention, preferably, a light incidence plane of the integrator rod has a reflecting layer having an opening for light incidence arranged in a central portion thereof, and a λ/4 plate and a reflective polarizing plate are arranged in this order along a traveling direction of light on the side of a light emission plane of the integrator rod.

By configuring the illuminating device in this way, in a case where illumination beams relating to one polarization component, among the illumination beams which have entered the integrator rod, pass through the reflective polarizing plate, and illumination beams relating to another polarization component are reflected by the reflective polarizing plate. This reflected light is reflected by the reflecting layer arranged on the side of the light incidence plane of the integrator rod, and reaches the reflective polarizing plate again. At this time, since the light has already passed through the λ/4 plate twice, the light rotates in the polarizing direction by 90 degrees and pass through the reflective polarizing plate as illumination beams according to one polarization component. That is, it is possible to align the polarizing direction of the light emitted from the integrator rod with substantially one kind of polarizing direction. Accordingly, the illuminating device is especially suitable for a projector using an electro-optical modulator which controls the polarizing direction like a liquid crystal device.

In the illuminating device of the aspect of the invention, preferably, the device further includes a polarized light converting element which is arranged on the light incidence side of the integrator rod to convert the illumination beams from the condensing lens into beams having substantially one kind of linearly polarized light component.

By configuring the illuminating device in this way, the polarizing direction of illumination beams entering the integrator rod is aligned with substantially one kind of polarizing direction. Therefore, the illumination device will be especially suitable for a projector using an electro-optical modulator which controls a polarizing direction like a liquid crystal device.

In the illuminating device of the aspect of the invention, preferably, the light incidence surface of the integrator rod, and the light emission surface of the polarized light converting element are adhered together.

By configuring the illuminating device in this way, undesirable multiple reflection between the polarized light converting element and the integrator rod is suppressed. As a result, a decrease in the light utilization efficiency or a rise in a stray light level is prevented. Moreover, the polarized light converting element and the integrator rod can be integrated easily. Moreover, occurrence of a positional deviation after assembling of an apparatus between the polarized light converting element and the integrator rods can be prevented in advance.

In this case, it is preferable to use adhesive having almost the same refractive index as the polarized light converting element and the integrator rod.

In the illuminating device of the aspect of the invention, preferably, the integrator optical system includes a first lens array having a plurality of first small lenses which split the illumination beams from the first light source, unit and the illumination beams emitted from the second light source unit and reflected by the two reflecting elements into a plurality of partial beams, a second lens array having a plurality of second small lenses corresponding to the first small lenses, respectively, a polarized light converting element which converts the partial beams from the second lens array into beams having substantially one kind of linearly polarized light component, and a superposition lens which superposes the light from the polarized light converting element in the illuminated region.

By configuring the illuminating device in this way, the in-plane light intensity distribution of illumination beams can be made more uniform by the action of the first lens array, the second lens array, and the superposition lens. Moreover, since it is possible to align the polarizing direction of illumination beams with substantially one kind of polarizing direction by the action of the polarized light converting element, the illumination device will be especially suitable for a projector using an electro-optical modulator which controls a polarizing direction like a liquid crystal device.

In the illuminating device of the aspect of the invention, preferably, the first lens array and the second lens array are respectively composed of three lens arrays including a lens array arranged in an optical path of the illumination beams from the first light source unit and split into four columns in a direction along the direction of a long side of each of the first small lenses or each of the second small lenses, a lens array arranged in an optical path of the illumination beams reflected by a reflecting element arranged on the side of the second light source unit and split into two columns in a direction along the direction of a long side of each of the first small lenses or each of the second small lenses, and a lens array arranged in an optical path of the illumination beams reflected by a reflecting element arranged opposite to the second light source unit and split into two columns in a direction along the direction of a long side of each of the first small lenses or each of the second small lenses.

By configuring the illuminating device in this way, the first lens array and the second lens array can be composed of three lens arrays, respectively. Therefore, since the size of each lens array can be made small as compared with a case where the first lens array and the second lens array are composed of one lens array, respectively, the design and manufacture of the first lens array and the second lens array can be facilitated.

Moreover, the light intensity distribution in the illuminated regions of the liquid crystal devices can be made uniform to some extent, and the size of each small lens can be set to a size above a certain value, by splitting each lens array into four columns and two columns as described above. Accordingly, since the length of a short side of each of the first small lenses does not become extremely short, the image of each of the first small lenses of the first lens array comes to fall into each of the corresponding second small lenses of the second lens array. As a result, it is possible to obtain excellent light utilization efficiency.

In the illuminating device of the aspect of the invention, preferably, each of the lens arrays constituting the first lens array and the second lens array is a lens array split into six rows in a direction along the direction of a short side of each of the first small lenses or each of the second small lenses.

By configuring the illuminating device in this way, it is possible to make the polarized light converting element arranged at the latter stage of the optical path into a comparatively simple and small structure while the effect of making light sufficiently uniform is obtained by the lens arrays. The illuminating device according to the aspect of the invention becomes an illuminating device suitable for a projector provided with an electro-optical modulator in which the aspect ratio of an image formation region is 3:4.

In the illuminating device of the aspect of the invention, preferably, each of the lens arrays constituting the first lens array and the second lens array is a lens array split into seven rows in a direction along the direction of a short side of each of the first small lenses or each of the second small lenses.

By configuring the illuminating device in this way, it is possible to make the polarized light converting element arranged at the latter stage of the optical path into a comparatively simple and small structure while the effect of making light sufficiently uniform is obtained by the lens arrays. The illuminating device according to the aspect of the invention becomes an illuminating device suitable for a projector provided with an electro-optical modulator for wide vision in which the aspect ratio of an image formation region is 9:16.

According to a second aspect of the invention, there is provided a projector including any one the above-mentioned illuminating devices, an electro-optical modulator modulating the light from the illuminating device according to image information, and a projection optical system projecting the light modulated by the electro-optical modulator.

For this reason, since the projector of the aspect of the invention has the above-mentioned illumination device, it becomes a high-luminance and compact projector capable of making the light utilization efficiency higher than before.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
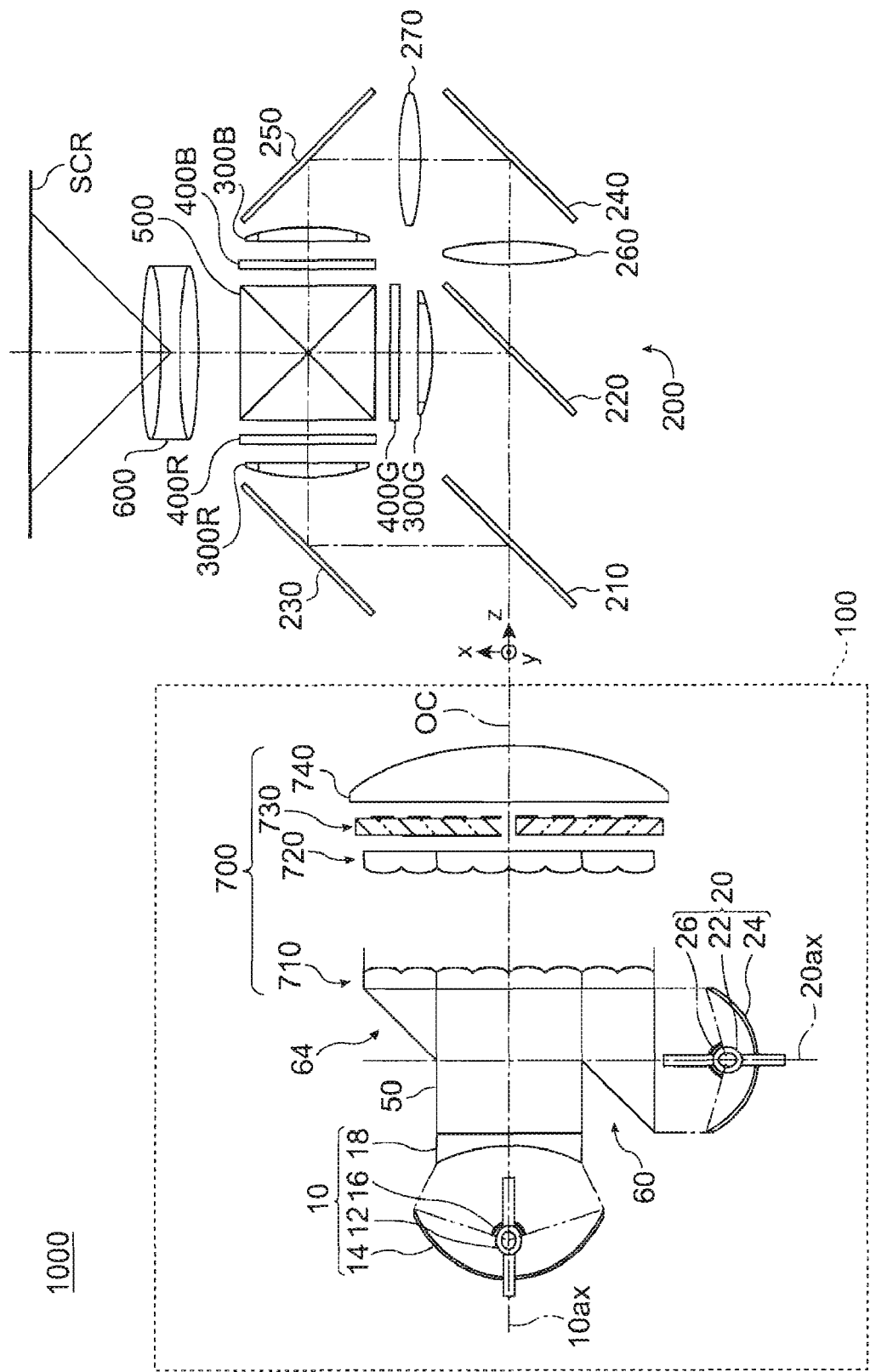
FIG. 1 is a view showing an illuminating device 100 and an optical system of a projector 1000, according to Embodiment 1.

Hereinafter, an illuminating device and a projector of the invention will be described on the basis of embodiments shown in the drawings.

Embodiment 1

Figure 2A:
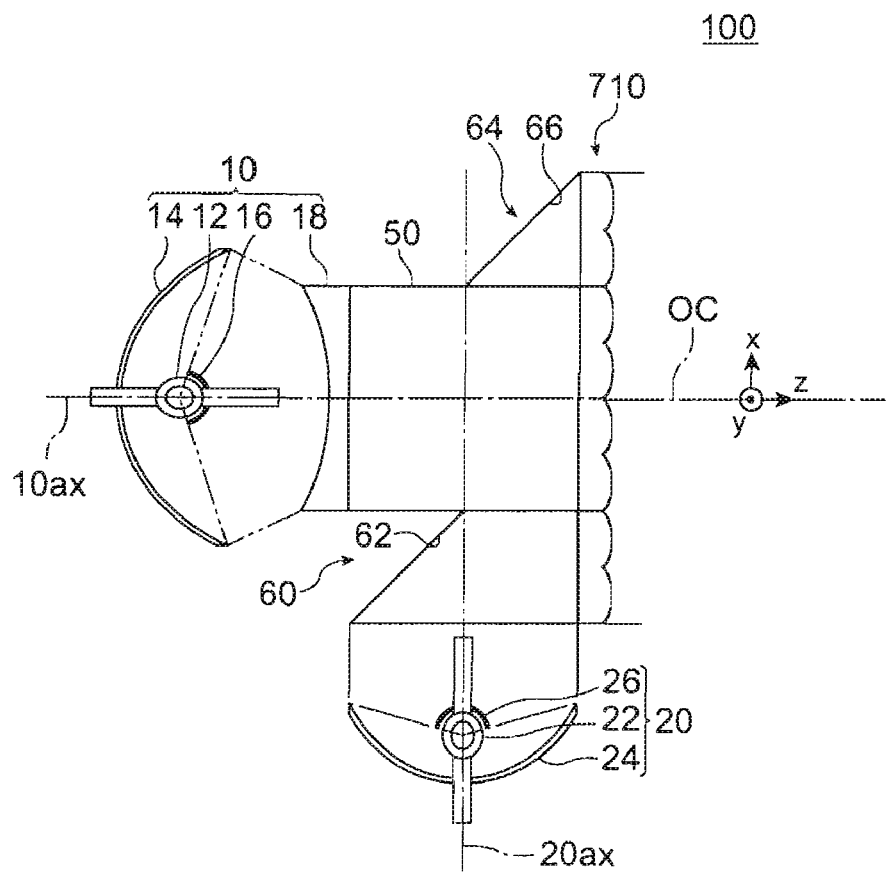
FIGS. 2A and 2B are views illustrating principal parts of the illuminating device 100 according to Embodiment 1.
Figure 2B:
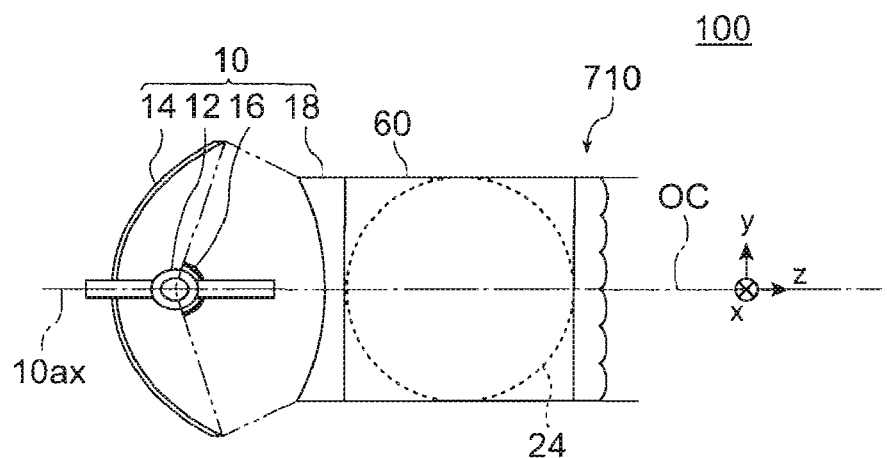
Figure 3:
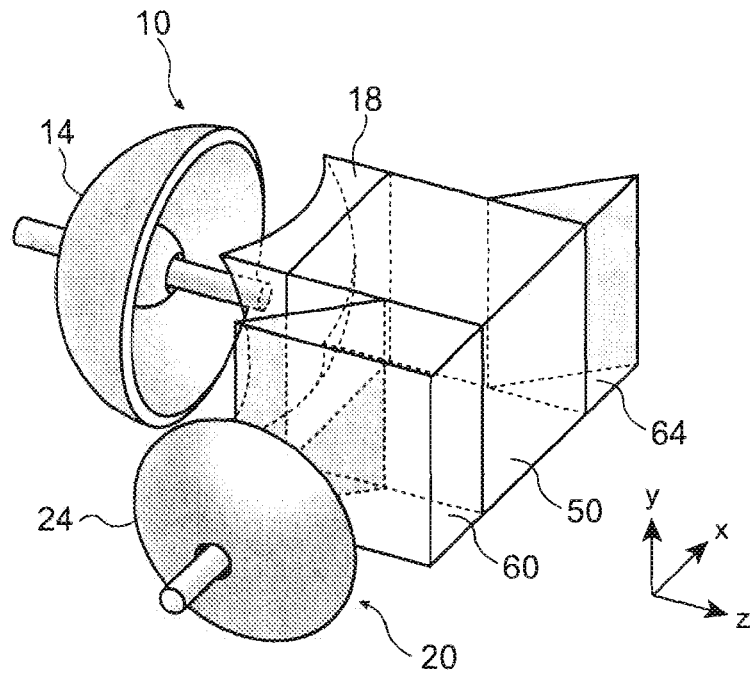
FIG. 3 is a perspective view of the principal parts of the illuminating device 100 according to Embodiment 1.

FIG. 1 is a view showing an illuminating device 100 and an optical system of a projector 1000, according to Embodiment 1. FIGS. 2A and 2B are views illustrating principal parts of the illuminating device 100 according to Embodiment 1. FIG. 2A is a top view of the principal parts of the illuminating device 100, and FIG. 2B is a side view of the principal parts of the illuminating device 100. FIG. 3 is a perspective view of the principal parts of the illuminating device 100 according to Embodiment 1. In addition, illustration of an integrator optical system 700 is omitted in FIG. 3.

Figure 4:
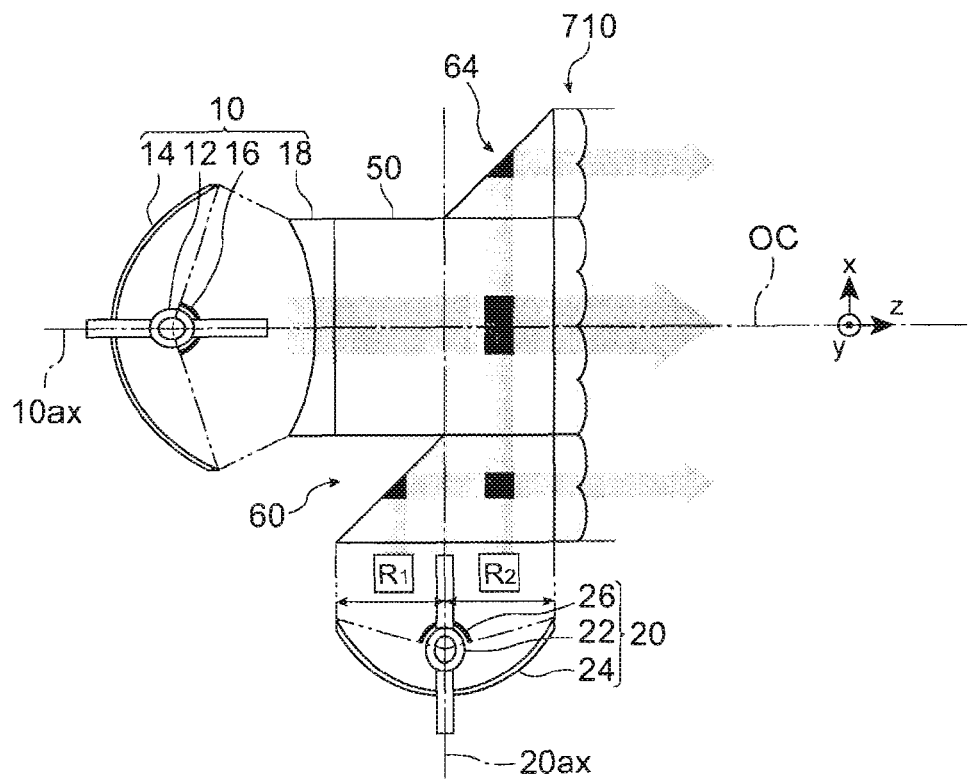
FIG. 4 is a view schematically showing the flow of illumination beams emitted from a first light source unit 10 and a second light source unit 20.
Figure 5:
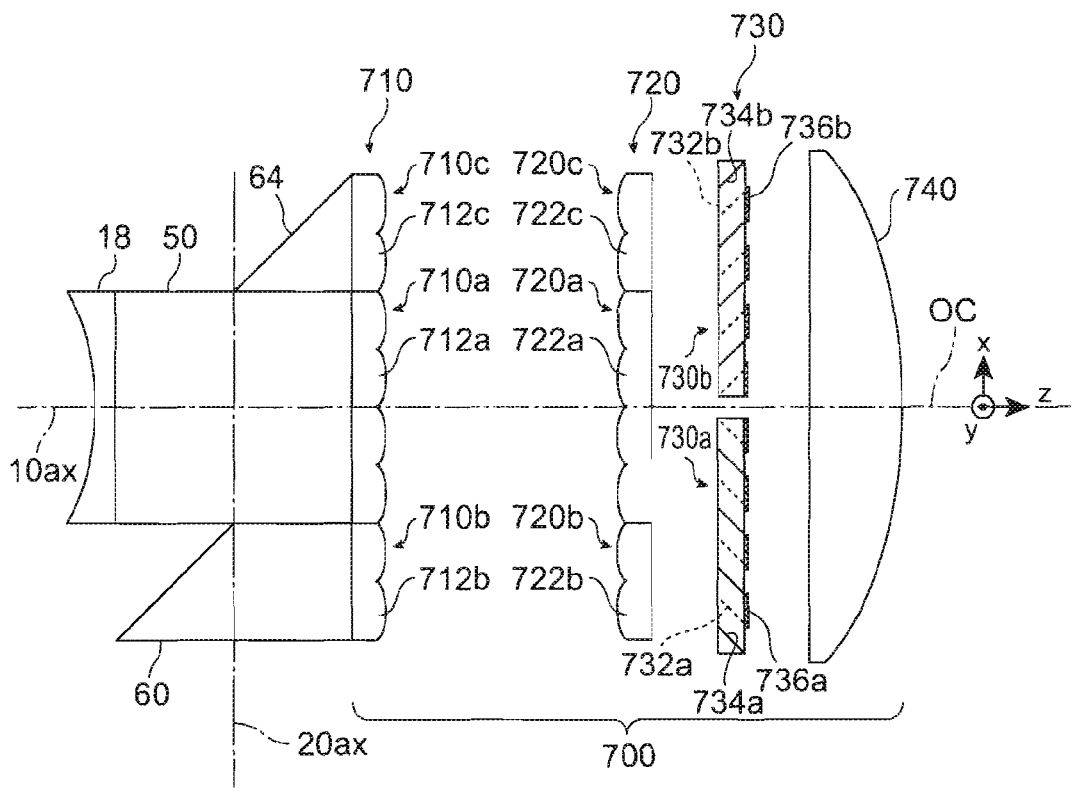
FIG. 5 is a view illustrating an integrator optical system 700.
Figure 6:
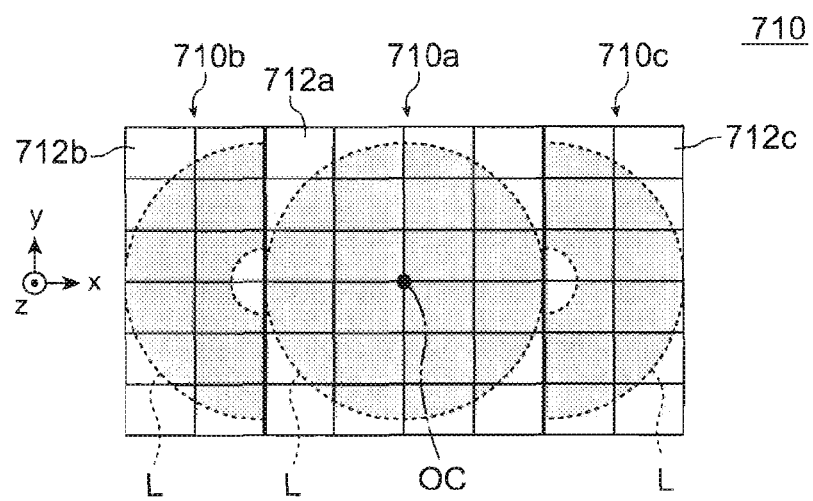
FIG. 6 is a front view of a first lens array 710.

FIG. 4 is a view schematically showing the flow of illumination beams emitted from a first light source unit 10 and a second light source unit 20. FIG. 5 is a view illustrating the integrator optical system 700. FIG. 6 is a front view of a first lens array 710. In addition, the contours L of the illumination beams are also shown in FIG. 6.

In the following description, the three directions which are orthogonal to one another are defined as a z-axis direction (the direction of a system optical axis OC in FIG. 1), an x-axis direction (a direction parallel to the sheet plane in FIG. 1 and orthogonal to the z-axis), and a y-axis direction (a direction perpendicular to the sheet plane in FIG. 1 and orthogonal to the z-axis), respectively.

The projector 1000 according to Embodiment 1, as shown in FIG. 1, is a projector including a so-called two-light-type illuminating device 100, a color separation light guide optical system 200 which separates the illumination beams from the illuminating device 100 into three color light components and guides the light components to an illuminated region, three liquid crystal devices 400R, 400G, and 400B as electro-optical modulators which modulate each of the three color light components separated by the color separation light guide optical system 200 according to image information, a cross dichroic prism 500 which synthesizes the color light components modulated by the liquid crystal devices 400R, 400G, and 400B, and a projection optical system 600 which projects the light synthesized by the cross dichroic prism 500 onto a projection surface, such as a screen SCR.

The illuminating device 100 according to Embodiment 1, as shown in FIGS. 1 to 3, is an illuminating device including a first light source unit 10 which emits substantially parallel illumination beams, a second light source unit 20 which emits substantially parallel illumination beams, reflecting prisms 60 and 64 as two reflecting elements arranged on both sides of an optical path of the illumination beams from the first light source unit 10, and an integrator optical system 700 having a function to convert the illumination beams emitted from the first light source unit 10 and the illumination beams emitted from the second light source unit 20 and reflected by the two reflecting prisms 60 and 64 into light having more uniform intensity distribution. A translucent member 50 is arranged in the optical path of the illumination beams from the first light source unit 10 between the two reflecting prisms 60 and 64.

First, the configuration of the first light source unit 10 and the second light source unit 20 will be described.

The first light source unit 10, as shown in FIGS. 1 to 3, has an ellipsoidal reflector 14, a first light-emitting tube 12 which has an emission center in the vicinity of a first focal point of the ellipsoidal reflector 14, a first secondary mirror 16 as a first reflecting section which reflects the light emitted towards the illuminated region from the first light-emitting tube 12 towards the first light-emitting tube 12, and a concave lens 18 which emits the converging light from the ellipsoidal reflector 14 as substantially parallel light. The first light source unit 10 emits beams having the optical axis 10ax as a central axis.

The first light-emitting tube 12 has a tubular bulb part and a pair of sealing parts extending on both sides of the tubular bulb part. A tubular bulb part is formed spherically and made from quartz glass, and has a pair of electrodes arranged in the tubular bulb part, and mercury, rare gas, and a small amount of halogen, which are enclosed in the tubular bulb part. As the first light-emitting tube 12 and the second light-emitting tube 22 as described hereinbelow, various light-emitting tubes can be adopted. For example, a metal halide lamp, a high-pressure mercury lamp, an ultrahigh pressure mercury lamp, etc. can be adopted.

The ellipsoidal reflector 14 has a cylindrical neck-shaped part which is inserted into and secured to one sealing part of the first light-emitting tube 12, and a reflecting concave surface which reflects the light emitted from the first light-emitting tube 12 towards a second focusing position.

The first secondary mirror 16 is a reflecting section which covers substantially the half of the tubular bulb part of the first light-emitting tube 12, and is arranged to face the reflecting concave surface of the ellipsoidal reflector 14. The first secondary mirror 16 is inserted into and secured to the other sealing part of the first light-emitting tube 12. The first secondary mirror 16 returns a portion of the light emitted from the first light-emitting tube 12, which is not directed to the ellipsoidal reflector 14, to the first light-emitting tube 12, and causes it to enter the ellipsoidal reflector 14.

The concave lens 18 is arranged in the ellipsoidal reflector 14 on the side of the illuminated region. The concave lens is also configured such that the light from the ellipsoidal reflector 14 is emitted towards the translucent member 50.

The second light source unit 20 has a parabolic reflector 24, a second light-emitting tube 22 which has an emission center in the vicinity of a focal point of the parabolic reflector 24, arid a second secondary mirror 26 as a second reflecting section which reflects the light, emitted towards the illuminated region from the second light-emitting tube 22 towards the second light-emitting tube 22. The second light source unit 20 emits beams having the optical axis 20$ax$ as a central axis.

The second light-emitting tube 22 has a tubular bulb part and a pair of sealing parts extending on both sides of the tubular bulb part. A tubular bulb part is formed spherically and made from quartz glass, and has a pair of electrodes arranged in the tubular bulb part, and mercury, rare gas, and a small amount of halogen, which are enclosed in the tubular bulb part.

The parabolic reflector 24 has a cylindrical neck-shaped part which is inserted into and secured to one sealing part of the second light-emitting tube 22, and a reflecting concave surface which reflects the light emitted from the second light-emitting tube 22 towards the illuminated region. The light emitted from the parabolic reflector 24 becomes substantially parallel beams.

The second secondary mirror 26 is a reflecting section which covers substantially the half of the tubular bulb part of the second light-emitting tube 22, and is arranged to face the reflecting concave surface of the parabolic reflector 24. The second secondary mirror 26 is inserted into and secured to the other sealing part of the second light-emitting tube 22.

The second secondary mirror 26 returns a portion of the light emitted from the second light-emitting tube 22, which is not directed to the parabolic reflector 24, to the second light-emitting tube 22, and causes it to enter the parabolic reflector 24.

Next, the reflecting prisms 60 and 64 and the translucent member 50 will be described.

The reflecting prisms 60 and 64, as shown in FIG. 1 to FIG. 3, are reflecting elements arranged on both sides of the optical path of the illumination beams from the first light source unit 10. The reflecting prism 60 is arranged in a given position on the side of the optical path facing the second light source unit 20, and the reflecting prism 64 is arranged in a given position on the side of the optical path opposite to the second light source unit 20. The reflecting prism 60 is a prism in which a reflecting surface 62 is formed at its one surface of a triangular prism. The reflecting prism 64 is a prism in which a reflecting surface 66 is formed at one surface of a prism having a trapezoidal sectional shape.

The reflecting prism 60 reflects the illumination beams emitted from a substantially half region on one side in an aperture plane of the parabolic reflector 24, among the illumination beams emitted from the second light source unit 20, towards the direction along the optical axis 10$ax$ (system optical axis OC). Moreover, the reflecting prism 64 reflects the illumination beams emitted from a substantially half region on the other side in the aperture plane of the parabolic reflector 24, among the illumination beams emitted from the second light source unit 20, towards the direction along the optical axis 10$ax$ (system optical axis OC).

The reflecting prisms 60 and 64 configured in this way cause the illumination beams from the first light source unit 10 to be transmitted therethrough as they are without being reflected thereby, and allows the illumination beams from the second light source unit 20 to be reflected towards the direction along the optical axis 10$ax$ (system optical axis OC) (refer to FIG. 4).

Here, the expression "substantially half region on one side in an aperture plane of the parabolic reflector 24" means a substantially right half region (a region indicated by reference numeral R1 shown in FIG. 4) as viewed from the translucent member 50 side when the aperture plane of the parabolic reflector 24 is split by a virtual plane orthogonal to the optical axis 10$ax$ of the first light source unit 10 and including the optical axis 20$ax$ of the second light source unit 20. Moreover, the expression "substantially half region on the other side in the aperture plane of the parabolic reflector 24" means a substantially left half region (a region indicated by reference numeral R2 shown in FIG. 4) as viewed from the translucent member 50 side when the aperture plane of the parabolic reflector 24 is split by the virtual plane.

The translucent member 50 is arranged in the optical path of the illumination beams from the first light source unit 10 between the two reflecting prisms 60 and 64. The translucent member 50 is composed a rectangular parallelepiped or cubic glass block, for example.

Next, the configuration of the integrator optical system 700 will be described.

The integrator optical system 700, as shown in FIGS. 5 and 6, has a first lens array 710 having a plurality of first small lenses 712$a$, 712$b$, and 712$c$ which split the illumination beams from the first light source unit 10 and the illumination beams emitted from the second light source unit 20 and reflected by the reflecting prisms 60 and 64 into a plurality of partial beams, a second lens array 720 having a plurality of second small lenses 722$a$, 722$b$, and 722$c$ corresponding to the first small lenses 712$a$, 712$b$, and 712$c$, respectively, a polarized light converting element 730 which converts the partial beams from the second lens array 720 into beams having substantially one kind of linearly polarized light component, and a superposition lens 740 which superposes the light from the polarized light converting element 730 in the illuminated region.

The first lens array 710 has a function as a beam splitting optical element which splits the light from the first light source unit 10 and the second light source unit 20 into a plurality of partial beams, and is composed of three lens arrays including a lens array 710$a$ arranged in the optical path of the illumination beams from the first light source unit 10, a lens array 710$b$ arranged in the optical path of the illumination beams reflected by the reflecting prism 60, and a lens array 710$c$ arranged in the optical path of the illumination beams reflected by the reflecting prism 64.

The lens array 710$a$, as shown in FIG. 6, has a configuration in which a plurality of first small lenses 712$a$ are arrayed in a matrix of six rows and four columns in a plane perpendicular to the z-axis. The lens array 710b has a configuration in which a plurality of first small lenses 712b are arrayed in a matrix of six rows and two columns in the plane perpendicular to the z-axis. The lens array 710c has a configuration in which a plurality of first small lenses 712c are arrayed in a matrix of six rows and two columns in the plane perpendicular to the z-axis.

The contour of each of the first small lenses 712a, 712b, and 712c is set so as to make a shape almost similar to the shape of the image formation regions of the liquid crystal devices 400R, 400G, and 400B. In the illuminating device 100 according to Embodiment 1, each of the first small lenses 712a, 712b, and 712c has a rectangular planar shape of "short side:long side=3:4."

The second lens array 720 has a function which forms the image of each of the first small lenses 712a, 712b, and 712c of the first lens array 710 in the vicinity of the image formation regions of the liquid crystal devices 400R, 400G, and 400B, together with the superposition lens 740. The second lens array 720 has almost the same configuration as the first lens array 710, and is composed of three lens arrays including a lens array 720a arranged in the optical path of the illumination beams from the first light source unit 10, a lens array 720b arranged in the optical path of the illumination beams reflected by the reflecting prism 60, and a lens array 720c arranged in the optical path of the illumination beams reflected by the reflecting prism 64.

Although illustration of the lens array 720a is omitted herein, the lens array 720a has a configuration in which a plurality of second small lenses 722a are arrayed in a matrix of six rows and four columns in a plane perpendicular to the z-axis. The lens array 720b has a configuration in which a plurality of second small lenses 722b are arrayed in a matrix of six rows and two columns in the plane perpendicular to the z-axis. The lens array 720c has a configuration in which a plurality of second small lenses 722c are arrayed in a matrix of six rows and two columns in the plane perpendicular to the z-axis.

The polarized light converting element 730 is a polarized light converting element which emits the partial beams split by the first lens array 710 as substantially one kind of linearly polarized light beams whose polarizing directions are aligned with one another. The polarized light converting element 730, as shown in FIG. 5, has two polarized light separating elements 730a and 730b, and λ/2 plates 736a and 736b as phase plates arranged in given positions in the light emission surface of each of the polarized light separating elements 730a and 730b.

The polarized light separating element 730a has a polarized light separating surface 732a which transmits an illumination beam relating to a P polarization component, among the illumination beams emitted from the second lens array 720 (a portion of the lens array 720a, and the lens array 720b), and which reflects an illumination beam relating to an S polarization component, among the above illumination beams, in a direction (x-axis direction) away from the system optical axis OC, and a reflecting surface 734a which reflects the beam relating to an S polarization component, which is reflected by the polarized light separating surface 732a, in a direction (z-axis direction) parallel to the beam relating to a P polarization component, which is transmitted through the polarized light separating surface 732a.

The λ/2 plate 736a is arranged in a position where a beam relating to a P polarization component, in the light emission surface of the polarized light separating element 730a, is emitted, and has a function to convert the beam relating to a P polarization component into a beam relating to an S polarization component.

The polarized light separating element 730b has a polarized light separating surface 732b which transmits an illumination beam relating to a P polarization component, among the illumination beams emitted from the second lens array 720 (a portion of the lens array 720a, and the lens array 720c), and which reflects an illumination beam relating to an S polarization component, among the above illumination beams, in a direction (x-axis direction) away from the system optical axis OC, and a reflecting surface 734b which reflects the beam relating to an S polarization component, which is reflected by the polarized light separating surface 732b, in a direction (z-axis direction) parallel to the beam relating to a P polarization component, which is transmitted through the polarized light separating surface 732b.

The λ/2 plate 736b is arranged in a position where a beam relating to a P polarization component, in the light emission surface of the polarized light separating element 730b, is emitted, and has a function to convert the beam relating to a P polarization component into a beam relating to an S polarization component.

The superposition lens 740 is an optical element for condensing a plurality of partial beams which have passed through the first lens array 710, the second lens array 720, and the polarized light converting element 730, and superposes the condensed light in the vicinity of the image formation regions of the liquid crystal devices 400R, 400G, and 400B. The superposition lens 740 is arranged such that the optical axis of the superposition lens 740 substantially coincides with the system optical axis OC of the illuminating device 100. In addition, although the superposition lens 740 shown in FIGS. 1 and 5 is composed of one lens, it may be composed of a compound lens obtained by combining a plurality of lenses.

Next, the configuration of each optical element arranged in the optical path further behind than the integrator optical system 700 will be described.

The color separation light guide optical system 200, as shown in FIG. 1, has dichroic mirrors 210 and 220, reflecting mirrors 230, 240, and 250, an incidence-side lens 260, and a relay lens 270. The color separation light guide optical system 200 has a function to separate the illumination light beams emitted from the superposition lens 740 into three color light components, i.e., red light, green light, and blue light, to guide the color light components to the corresponding three liquid crystal devices 400R, 400G, and 400B used as objects to be illuminated.

The dichroic mirrors 210 and 220 are optical elements in which a wavelength selection film which reflects a beam in a predetermined wavelength range onto a substrate, and which transmits beams in other wavelength ranges is formed. The dichroic mirror 210 arranged at the front stage of the optical path is a mirror which reflects a red light component and transmits other color light components. The dichroic mirror 220 arranged at the rear stage of the optical path is a mirror which reflects a green light component and transmits a blue light component.

The red light component reflected by the dichroic mirror 210 is bent by the reflecting mirror 230, and enters the image formation region of the liquid crystal device 400R for red light through the condensing lens 300R.

The condensing lens 300R is provided to convert each of the partial beams from the superposition lens 740 into a beam substantially parallel to a main light ray. The condensing lenses 300G and 300B arranged at the front stage of the optical paths of the other liquid crystal devices 400G and 400B are configured similarly to the condensing lens 300R.

The green light component of the green light component and blue light component which are transmitted through the dichroic mirror 210 is reflected by the dichroic mirror 220, passes through the condensing lens 300G, and enters the image formation region of the liquid crystal device 400G for green light. On the other hand, the blue light component is transmitted through the dichroic mirror 220, passes through the incidence-side lens 260, the incidence-side reflecting mirror 240, the relay lens 270, the emission-side reflecting mirror 250, and the condensing lens 300B, and enters the image formation region of the liquid crystal device 400B for blue light. The incidence-side lens 260, the relay lens 270, and the reflecting mirrors 240 and 250 have a function to guide the blue light component which is transmitted through the dichroic mirror 220 to the liquid crystal device 400B.

In addition, such incidence-side lens 260, relay lens 270, and reflecting mirrors 240 and 250 are provided in an optical path of blue light in order to prevent a decrease in the use efficiency of light caused by divergence of light, etc. because the length of the optical path of blue light is larger than the length of the optical paths of other color light components. Although the projector 1000 according to Embodiment 1 has such a configuration because the optical path of blue light is long, a configuration in which the incidence-side lens 260, the relay lens 270, and the reflecting mirrors 240 and 250 are used for the optical path of red light by increasing the length of the optical path of red light is also considered.

The liquid crystal devices 400R, 400G, and 400B modulate the illumination beams according to image information, and are illumination objects of the illuminating device 100.

The liquid crystal devices 400R, 400G, and 400B are provided by hermetically sealing liquid crystal as an electro-optical material in a pair of transparent glass substrates, and for example, modulate the polarizing direction of one kind of linearly polarized light emitted from an incident-side polarizing plate according to given image information, using a polysilicon TFTs as switching elements.

As the liquid crystal devices 400R, 400G, and 400B, liquid crystal devices the image formation regions of which has a rectangular planar shape of "short side:long side=3:4" are used.

In addition, although illustration is omitted, an incident-side polarizing plate is interposed between each of the condensing lenses 300R, 300G, and 300B and each of the liquid crystal devices 400R, 400G, and 400B, and an emission-side polarizing plate is interposed between each of the liquid crystal devices 400R, 400G, and 400B and the cross dichroic prism 500. Light modulation of each entering color light component is performed by the incident-side polarizing plate, the liquid crystal devices 400R, 400G, and 400B, and the emission-side polarizing plate.

The cross dichroic prism 500 is an optical element which synthesizes an optical image emitted from the emission-side polarizing plate and modulated for every color light component to form a color image. This cross dichroic prism 500 is formed in a substantially square shape in plan view in which four rectangular prisms are pasted together, and dielectric multi-layers are formed in substantially X-shaped interfaces in which the rectangular prisms are pasted together. A dielectric multilayer formed in one substantially X-shaped interface reflects red light, and a dielectric multilayer formed in the other interface reflects blue light. When red light and blue light are bent and aligned in the traveling direction of green light by these dielectric multi-layers, the three color light components are synthesized.

The color image emitted from the cross dichroic prism 500 is projected in an enlarged manner by the projection optical system 600 to form a big screen image on the screen SCR.

According to the illuminating device 100 according to Embodiment 1 configured as described above, the two reflecting prisms 60 and 64 are arranged on both sides of the optical path of the illumination beams from the first light source unit 10 such that they do not reflect the illumination beams from the first light source unit 10, but allow the illumination beams to pass therethrough as they are. Thus, as for the first light source unit 10, it is possible to utilize not only central illumination beams in the light source unit, but peripheral illumination beams which are not utilized in the related art as illumination light. Moreover, each of the two reflecting prisms 60 and 64 is arranged such that it reflects the illumination beams emitted from the substantially half region on one side of the aperture plane of the parabolic reflector 24 of the second light source unit 20 and the illumination beams emitted from the substantially half region on the other side of the aperture plane. Thus, as for the second light source unit 20, it is possible to utilize not only central illumination beams in the light source unit, but peripheral illumination beams which are not utilized in the related art as illumination light. That is, according to the illuminating device 100 according to Embodiment 1, as for both the first light source unit 10 and the second light source unit 20, it is possible to utilize both the central illumination beams and peripheral illumination beams in the light source units. Therefore, high luminance can be attained, and the light utilization efficiency can be made higher than before.

Moreover, according to the illuminating device 100 according to Embodiment 1, the first light source unit 10 and the second light source unit 20 are configured such that the emission directions of illumination beams become mutually different directions, and the emission directions of the illumination beams emitted from the first light source unit 10 and the second light source unit 20 are aligned in one direction by using the two reflecting prisms 60 and 64. Therefore, a compact illuminating device can be configured.

Moreover, according to the illuminating device 100 according to Embodiment 1, a light source unit composed of an ellipsoidal reflector and a concave lens is used as the first light source unit 10. Therefore, the diameter of the illumination beams emitted from the first light source unit 10 can be made comparatively small. That is, since the distance between two reflecting prisms can be shortened comparatively, even if the size of the reflecting prisms 60 and 64 becomes larger than before, it is possible to maintain a compact illuminating device as the whole illuminating device.

Moreover, according to the illuminating device 100 according to Embodiment 1, the above-mentioned first secondary mirror 16 is provided in the first light-emitting tube 12, and the above-mentioned second secondary mirror 26 is provided in the second light-emitting tube 22. Therefore, the ellipsoidal reflector 14 and the parabolic reflector 24 can be miniaturized without requiring setting the size of the ellipsoidal reflector 14 and the parabolic reflector 24 to such a size that even the ends of the first light-emitting tube 12 and second light-emitting tube 22 on the side of the illuminated region are covered. As a result, it is possible to realize a compact illuminating device. Moreover, the ellipsoidal reflector 14 and the parabolic reflector 24 can be miniaturized. Accordingly, since the size of the integrator optical system 700 arranged at the latter stage of the optical path can be made small, a more compact illuminating device can be obtained.

Accordingly, the illuminating device 100 according to Embodiment 1 becomes a high-luminance and compact illuminating device capable of making the light utilization efficiency higher than before.

Moreover, in the illuminating device 100 according to Embodiment 1, a light source unit composed of an ellipsoidal reflector and a concave lens is used as the first light source unit 10, and a light source unit composed of a parabolic reflector is used as the second light source unit 20. Therefore, the illuminating device has the following effects.

That is, in the illuminating device 100 according to Embodiment 1, the illumination beams emitted from the first light source unit 10 will pass through the central region of the integrator optical system 700. In this case, according to the illuminating device 100 according to Embodiment 1, a light source unit composed of an ellipsoidal reflector and a concave lens and capable of eliminating a region (region where the in-plane light intensity distribution is extremely small) of a shadow in a central portion of illumination beams, which is produced by a light-emitting tube and a secondary mirror, is used as the first light source unit 10. Therefore, it is possible to keep the in-plane light intensity distribution in an illuminated region from becoming nonuniform due to existence of a region of a shadow in a central portion of illumination beams, which is provided by a light-emitting tube and a secondary mirror.

Moreover, according to the illuminating device 100 according to Embodiment 1, a light source unit composed of a parabolic reflector having a high parallelism of illumination beams is used as the second light source unit 20. Therefore, it is possible to keep the in-plane light intensity distribution in an illuminated region from becoming nonuniform due to a difference in the distance from the second light source unit 20 to each of the reflecting prisms 60 and 64 (the reflecting prism 60 arranged on the side of the second light source unit 20 and the reflecting prism 64 arranged opposite to the second light source unit 20).

In the illuminating device 100 according to Embodiment 1, the translucent member 50 is arranged in the optical path of the illumination beams from the first light source unit 10 between the two reflecting prisms 60 and 64. Since the refractive index of a medium constituting the translucent member 50 is larger than the refractive index of air, it is possible to make the length of the optical path of the illumination beams passing through the translucent member 50 comparatively short. As a result, it is possible to make the illuminating device 100 more compact.

In the illuminating device, 100 according to Embodiment 1, the reflecting prisms 60 and 64 are used as two reflecting elements. Since the refractive index of a medium constituting the reflecting prisms 60 and 64 is larger than the refractive index of air, it is possible to make the length of the optical path of the illumination beams passing through the reflecting prisms 60 and 64 comparatively short. As a result, it is possible to make the illuminating device 100 more compact.

In the illuminating device 100 according to Embodiment 1, the translucent member 50, the reflecting prisms 60 and 64, the concave lens 18, and the first lens array 710 are adhered together via adhesion layers, respectively. Accordingly, since unnecessary reflection between the members may decrease, the light utilization efficiency improves, and a stray light level decreases. Moreover, these members can be integrated easily, and occurrence of a positional deviation after assembling of an apparatus can be prevented in advance. In addition, it is more preferable to use an adhesive having almost the same refractive index as the above-mentioned members.

In the illuminating device 100 according to Embodiment 1, the integrator optical system 700 has the above first lens array 710, the above second lens array 720, the polarized light converting element 730 which converts each of the partial beams from the second lens array 720 into beams having substantially one kind of linearly polarized light component, and the superposition lens 740 which superposes the beams from the polarized light converting element 730 in an illuminated region. Therefore, it is possible to make the in-plane light intensity distribution of illumination beams more uniform by the action of the first lens array 710, the second lens array 720, and the superposition lens 740. Moreover, since it is possible to align the polarizing direction of illumination beams with substantially one kind of polarizing direction by the action of the polarized light converting element 730, the illumination device will be especially suitable for a projector using an electro-optical modulator which controls a polarizing direction like a liquid crystal device.

In the illuminating device 100 according to Embodiment 1, the first lens array 710 is composed of three lens arrays including the lens array 710a arranged in the optical path of the illumination beams from the first light source unit 10 and split into four columns in the direction (x-axis direction) along the direction of a long side of the first small lens, the lens array 710b arranged in the optical path of the illumination beams reflected by the reflecting prism 60 and split into two columns, and the lens array 710c arranged in the optical path of the illumination beams reflected by the reflecting prism 64 and split into two columns. Moreover, the second lens array 720 is composed of three lens arrays including the lens array 720a arranged in the optical path of the illumination beams from the first light source unit 10 and split into four columns in the direction along the direction of a long side of the second small lens, the lens array 720b arranged in the optical path of the illumination beams reflected by the reflecting prism 60 and split into two columns, and the lens array 720c arranged in the optical path of the illumination beams reflected by the reflecting prism 64 and split into two columns.

Accordingly, the first lens array 710 and the second lens array 720 can be composed of three lens arrays, respectively. Therefore, since the size of each lens array can be made small as compared with a case where the first lens array and the second lens array are composed of one lens array, respectively, the design and manufacture of the first lens array 710 and the second lens array 720 can be facilitated.

Moreover, the light intensity distribution in the illuminated regions of the liquid crystal devices 400R, 400G, and 400B can be made uniform to some extent, and the size of each small lens can be set to a size above a certain value, by splitting each lens array into four rows and two columns as described above. Accordingly, since the length of a short side of each of the first small lenses does not become extremely short, the image of each of the first small lenses 712a, 712b, and 712c of the first lens array 710 comes to be swallowed by each of the corresponding second small lenses 722a, 722b, and 722c of the second lens array 720. As a result, it is possible to obtain excellent light utilization efficiency.

Moreover, in the illuminating device 100 according to Embodiment 1, each of the lens arrays 710a, 710b, and 710c constituting the first lens array 710 is a lens array split into six rows in the direction (y-axis direction) along the direction of a short side in a first small lens, and each of the lens arrays 720a, 720b, and 720c constituting the second lens array 720 is a lens array split into six rows in the direction along the direction of a short side in a second small lens. Therefore, it is possible to make the polarized light converting element 730 arranged at the latter stage of the optical path into a comparatively simple and small structure while sufficient optical equalization effect is obtained by the lens arrays. The illuminating device 100 according to Embodiment 1 becomes an illuminating device suitable for a projector provided with an electro-optical modulator in which the aspect ratio of an image formation region is 3:4.

In the illuminating device 100 according to Embodiment 1, as shown in FIG. 5, the length of the second lens array 720 along the x-axis direction is almost equal to the length of the first lens array 710 along the x-axis direction. Therefore, lens arrays having no eccentricity or small eccentricity can be used as the first lens array 710 (lens arrays 710*a*, 710*b*, and 710*c*) and the second lens array 720 (lens arrays 720*a*, 720*b*, and 720*c*). As a result, manufacture of the first lens array 710 and the second lens array 720 becomes easy.

The projector 1000 according to Embodiment 1 is a projector provided with the illuminating device 100 according to the above-mentioned Embodiment 1, the liquid crystal devices 400R, 400G, and 400B which modulate the light from the illuminating device 100 according to image information, and the projection optical system 600 which projects the light modulated by the liquid crystal devices 400R, 400G, and 400B.

For this reason, since the projector 1000 according to Embodiment 1 has the above-mentioned illumination device 100, it becomes a high-luminance and compact projector capable of making the light utilization efficiency higher than before.

Embodiment 2

Figure 7A:
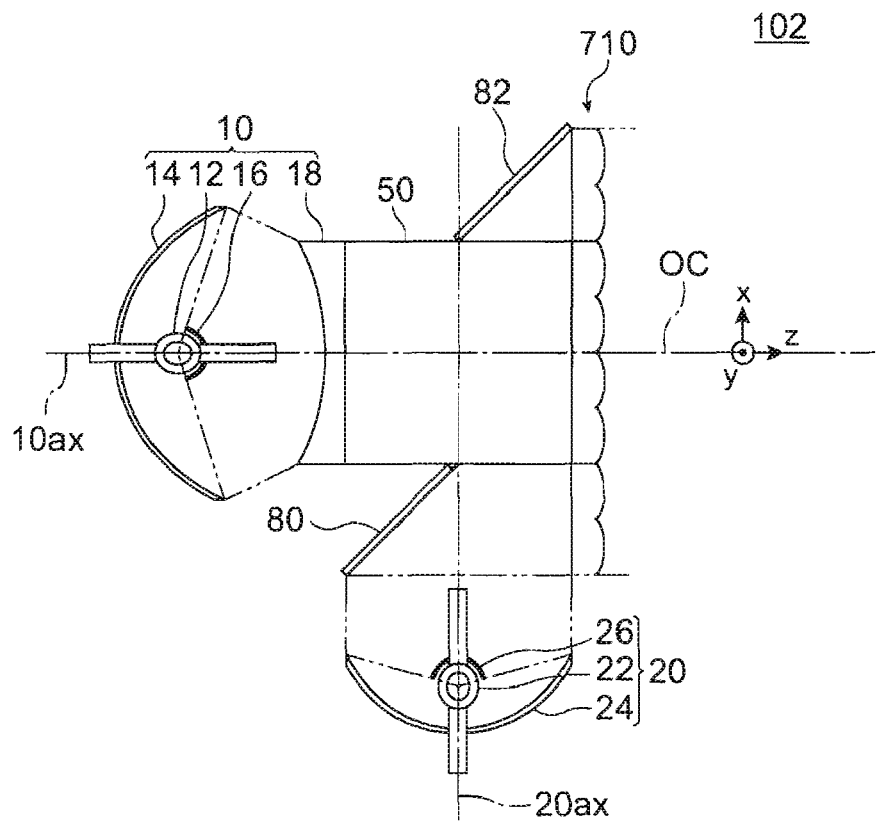
FIGS. 7A and 7B are views illustrating an illuminating device 102 according to Embodiment 2.
Figure 7B:
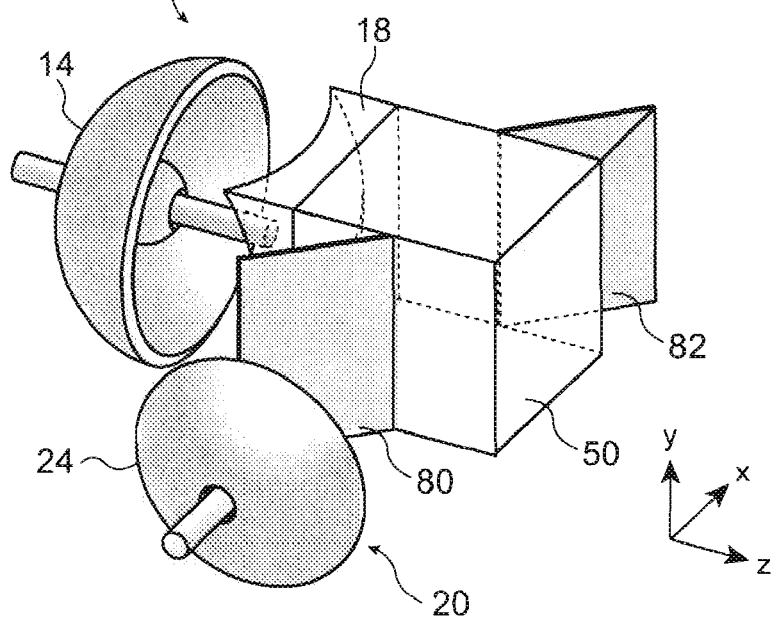

FIGS. 7A and 7B are views illustrating an illuminating device 102 according to Embodiment 2. FIG. 7A is a top view of principal parts of the illuminating device 102, and FIG. 7B is a perspective view of the principal parts of the illuminating device 102. In addition, in FIGS. 7A and 7B, the same members as those of FIG. 2A and FIG. 3 are denoted by the same reference numerals, and detailed description thereof is omitted.

Although the illuminating device 102 according to Embodiment 2 basically has a configuration similar to the illuminating device 100 according to Embodiment 1, it is different from the illuminating device 100 according to Embodiment 1 in terms of the kind of reflecting elements.

That is, in the illuminating device 102 according to Embodiment 2, as shown in FIGS. 7A and 7B, the reflecting mirrors 80 and 82 are used as two reflecting elements.

The reflecting mirror 80 is arranged in a given position on the side of the optical path of the illumination beams from the first light source unit 10 facing the second light source unit 20, and the reflecting mirror 82 is arranged in a given position on the side of the optical path opposite to the second light source unit 20.

The reflecting mirror 80 reflects the illumination beams emitted from a substantially half region on one side in an aperture plane of the parabolic reflector 24, among the illumination beams emitted from the second light source unit 20, towards the direction along the optical axis 10*ax* (system optical axis OC). Moreover, the reflecting mirror 82 reflects the illumination beams emitted from a substantially half region on the other side in the aperture plane of the parabolic reflector 24, among the illumination beams emitted from the second light source unit 20, towards the direction along the optical axis 10*ax* (system optical axis OC).

The reflecting mirrors 80 and 82 configured in this way, similarly to the illumination device 100 according to Embodiment 1, cause the illumination beams from the first light source unit 10 to be transmitted therethrough as they are without being reflected thereby, and allows the illumination beams from the second light source unit 20 to be reflected towards the direction along the optical axis 10*ax* (system optical axis OC).

As such, the illuminating device 102 according to Embodiment 2 is different from the illuminating device 100 according to Embodiment 1 in terms of the kind of the reflecting elements. However, the illumination device 102 has the same configuration as the illuminating device 100 according to Embodiment 1 in terms of other points. Therefore, similarly to the illuminating device 100 according to Embodiment 1, a high-luminance and compact illuminating device capable of making the light utilization efficiency higher than before can be obtained.

Since the illuminating device 102 according to Embodiment 2 has the same configuration as the illuminating device 100 according to Embodiment 1 in terms of other points than the kind of reflecting elements, it has the same effects as the illuminating device 100 according to Embodiment 1.

Embodiment 3

In describing the features and effects of the illuminating device 104 and the projector 1004 according to Embodiment 3, the configuration of the projector 1004 will first be described with reference to FIGS. 8A to 8C.

Figure 8A:
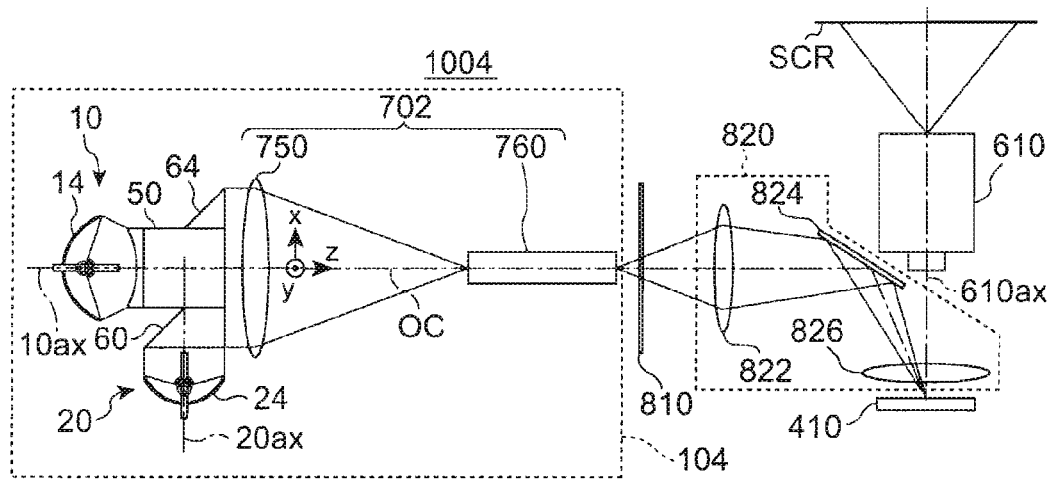
FIGS. 8A to 8C are views illustrating an illuminating device 104 and a projector 1004, according to Embodiment 3.
Figure 8B:
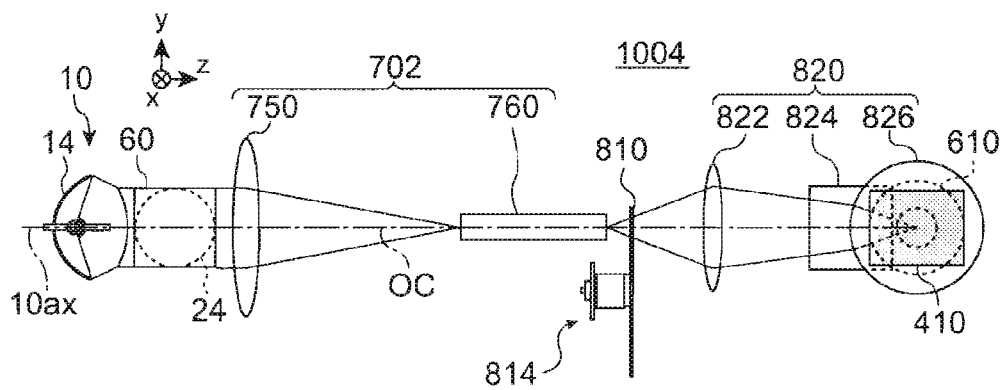
Figure 8C:
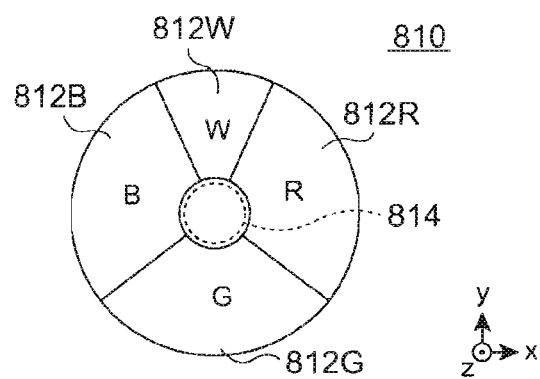

FIGS. 8A to 8C are views illustrating the illuminating device 104 and the projector 1004, according to Embodiment 3. FIG. 8A is a plan view showing an optical system of the projector 1004, FIG. 8B is a side view showing the optical system of a projector 1004, and FIG. 8C is a view of a color wheel 810 as seen along the system optical axis OC. In addition, in FIGS. 8A and 8B, the same members as those of FIG. 1 are denoted by the same reference numerals, and detailed description thereof is omitted.

The projector 1004 according to Embodiment 3, as shown in FIGS. 8A and 8B, is a projector including an illuminating device 104, a relay optical system 820 which guides the illumination beams from the illuminating device 104 to an illuminated region, a micro-mirror-type modulator 410 as an electro-optical modulator which modulates the light from the relay optical system 820 according to image information, and a projection optical system 610 which projects the light modulated by the micro-mirror-type modulator 410 onto a projection surface, such as the screen SCR.

The illuminating device 104 according to Embodiment 3 is an illuminating device including a first light source unit 10 which emits substantially parallel illumination beams, a second light source unit 20 which emits substantially parallel illumination beams, reflecting prisms 60 and 64 as two reflecting elements arranged on both sides of an optical path of the illumination beams from the first light source unit 10, and an integrator optical system 702 having a function to convert the illumination beams emitted from the first light source unit 10 and the illumination beams emitted from the second light source unit 20 and reflected by the two reflecting prisms 60 and 64 into light having more uniform intensity distribution. A translucent member 50 is arranged in the optical path of the illumination beams from the first light source unit 10 between the two reflecting prisms 60 and 64.

Since the first light source unit 10, the second light source unit 20, the reflecting prisms 60 and 64, and the translucent member 50 are the same as those described in Embodiment 1, description thereof is omitted.

The integrator optical system 702 has a condensing lens 750 which converts into converging light the illumination beams emitted from the first light source unit 10 and the illumination beams emitted from the second light source unit 20 and reflected by the reflecting prisms 60 and 64, and an integrator rod 760 which converts the illumination beams from the condensing lens 750 into light having more uniform intensity distribution.

The condensing lens 750 has a function to condense the illumination beams from the first light source unit 10 and the second light source unit 20 to a portion in the vicinity of the light incidence surface of to integrator rod 760. In addition, although the condensing lens 750 shown in FIGS. 8A and 8B is composed of one lens, it may be composed of a compound lens obtained by combining a plurality of lenses.

The integrator rod 760 is an optical element having a function to perform multiple reflection of the light from the condensing lens 750 therein to convert the light from the condensing lens 750 into light having more uniform intensity distribution. As the integrator rod 760, for example, a solid glass rod can be used preferably.

The shape of the light emission surface of the integrator rod 760 is set so as to make a shape almost similar to the shape of the image formation regions of the micro-mirror-type modulator 410. However, since the system optical axis OC is arranged so as to incline with respect to the central axis of the micro-mirror-type modulator 410, the light irradiated on the micro-mirror-type modulator 410 will have a contour distorted according to this inclination. Accordingly, the shape which allows correction of distortion of the contour of the light irradiated onto the micro-mirror-type modulator 410 is more preferable as the shape of the light emission surface of the integrator rod 760 in such a case.

A color wheel 810 is arranged on the light emission side of the integrator rod 760. The color wheel 810, as shown in FIG. 8C, is a disk-like member in which three transmissive color filters 812R, 812G, and 812B are formed in four fan-like regions delimited along the direction of rotation thereof. A motor 814 for rotating the color wheel 810 is arranged in the central portion of the color wheel 810.

The color filter 812R transmits a red wavelength range of light among the illumination beams from the integrator rod 760, and reflects or absorbs other wavelength ranges of light among the illumination beams, thereby transmitting only a red light component. Similarly, the color filter 812G or 812B transmits a green or blue wavelength range of light among the illumination beams from the integrator rod 760, and reflects or absorbs other wavelength ranges of light among the illumination beams, thereby transmitting only a green or blue light component. As the color filters 812R, 812G, and 812B, for example, a dielectric multilayer, a filter plate formed using a coating material, etc. can be used preferably. The region of the four fan-like regions except for the color filters 812R, 812G and 812B serves as a light transmission region 812W so that the light from the integrator rod 760 can pass the region as it is. This light transmission region 812W can increase the luminance in a projection image and secure the brightness of a projection image.

In addition, the color wheel 810 can also be omitted, and the projection image in this case is a monochrome image.

As the illumination beams emitted from the integrator rod 760 pass through the color wheel 810, they become illumination beams including three color light components, i.e., red light, green light, and blue light, as described above. As a result, the illumination beams are enlarged by the relay optical system 820, and are then radiated onto the image formation region of the micro-mirror-type modulator 410.

The relay optical system 820 has a relay lens 822, a reflecting mirror 824, and a condensing lens 826, and has a function to guide the illumination beams from the illuminating device 104 (color wheel 810) to the image formation region of the micro-mirror-type modulator 410.

The relay lens 822 has a function to form an image in the vicinity of the image formation region of the micro-mirror-type modulator 410 without causing the illumination beams from the illuminating device 104 to diverge, along with the condensing lens 826. In addition, although the relay lens 822 shown, in FIGS. 8A and 8B is composed of one lens, it may be composed of a compound lens obtained by combining a plurality of lenses.

The reflecting mirror 824 is arranged so as to incline with respect to the system optical axis OC, and bends the illumination beams from the relay lens 822 to guide them to the micro-mirror-type modulator 410. Accordingly, the projector can be made compact.

The condensing lens 826 substantially superposes the illumination beams from the relay lens 822 and the reflecting mirror 824 on the image formation region of the micro-mirror-type modulator 410, and enlarges and projects the light modulated by the micro-mirror-type modulator 410, along with the projection optical system 610.

The micro-mirror-type modulator 410 is a reflecting direction control type light modulator having a function to reflect the light from the relay optical system 820 by a micro mirror corresponding to each pixel according to image information, thereby emitting image light showing an image to the projection optical system 610. As the micro-mirror-type modulator 410, for example, a DMD (digital micro mirror device) (brand of TI, Inc.) can be used.

The image light emitted from the micro-mirror-type modulator 410 is projected in an enlarged manner by the projection optical system 610 to form a big screen image on the screen SCR.

The micro-mirror-type modulator 410 and the projection optical system 610 are arranged such that their central axes coincide with each other. In addition, in a case where a projector having a configuration of swing projection is used as the projector 1004 according to Embodiment 3, it is preferable to adopt a configuration in which the projection optical axis 610ax of the projection optical system 610 deviate in the direction of swing from the central axis of the micro-mirror-type modulator 410.

Even in the illuminating device 104 and projector 1004 according to Embodiment 3 configured as described above, similarly to the illuminating device 100 and projector 1000 according to Embodiment 1, the reflecting prisms 60 and 64 are arranged on both sides of the optical path of the illumination beams from the first light source unit 10 such that they do not reflect the illumination beams from the first light source unit 10, but allow the illumination beams to pass therethrough as they are. Thus, as for the first light source unit 10, it is possible to utilize not only central illumination beams in the light source unit 10, but peripheral illumination beams which are not utilized in the related art as illumination light. Moreover, each of the two reflecting prisms 60 and 64 is arranged such that it reflects the illumination beams emitted from the substantially half region on one side of the aperture plane of the parabolic reflector 24 of the second light source unit 20 and the illumination beams emitted from the substantially half region on the other side of the aperture plane. Thus, as for the second light source unit 20, it is possible to utilize not only central illumination beams in the light source unit, but peripheral illumination beams which are not utilized in the related art as illumination light. That is, according to the illuminating device 100 according to Embodiment 1, as for both the first light source unit 10 and the second light source unit 20, it is possible to utilize both the central illumination beams and peripheral illumination beams in the light source units. Therefore, high luminance can be attained, and the light utilization efficiency can be made higher than before.

Moreover, according to the illuminating device 104 according to Embodiment 3, the first light source unit 10 and the second light source unit 20 are configured such that the emission directions of illumination beams become mutually different directions, and the emission directions of the illumination beams emitted from the first light source unit 10 and the second light source unit 20 are aligned in one direction by using the two reflecting prisms 60 and 64. Therefore, a compact illuminating device can be configured.

Moreover, according to the illuminating device 104 according to Embodiment 3, a light source unit composed of an ellipsoidal reflector and a concave lens is used as the first light source unit 10. Therefore, the diameter of the illumination beams emitted from the first light source unit 10 can be made comparatively small. That is, since the distance between two reflecting prisms can be shortened comparatively, even if the size of the reflecting prisms 60 and 64 becomes larger than before, it is possible to maintain a compact illuminating device as the whole illuminating device.

Moreover, according to the illuminating device 104 according to Embodiment 3, the first secondary mirror 16 is provided in the first light-emitting tube 12, and the second secondary mirror 26 is provided in the second light-emitting tube 22. Therefore, the ellipsoidal reflector 14 and the parabolic reflector 24 can be miniaturized without requiring setting the size of the ellipsoidal reflector 14 and the parabolic reflector 24 to such a size that even the ends of the first light-emitting tube 12 and second light-emitting tube 22 on the side of the illuminated region are covered. As a result, it is possible to realize a compact illuminating device. Moreover, the ellipsoidal reflector 14 and the parabolic reflector 24 can be miniaturized. Accordingly, since the size of the integrator optical system 702 arranged at the latter stage of the optical path can be made small, a more compact illuminating device can be obtained.

Accordingly, the illuminating device 104 according to Embodiment 3 becomes a high-luminance and compact illuminating device capable of making light utilization efficiency higher than before.

Since the illuminating device 104 according to Embodiment 3 has the same configuration as the illuminating device 100 according to Embodiment 1 in terms of other points than the configuration of the integrator optical system, it has the same effects as the illuminating device 100 according to Embodiment 1.

Since the projector 1004 according to Embodiment 3 has the above-mentioned illumination device 104, it becomes a high-luminance and compact projector capable of making light utilization efficiency higher than before.

Embodiment 4

Figure 9A:
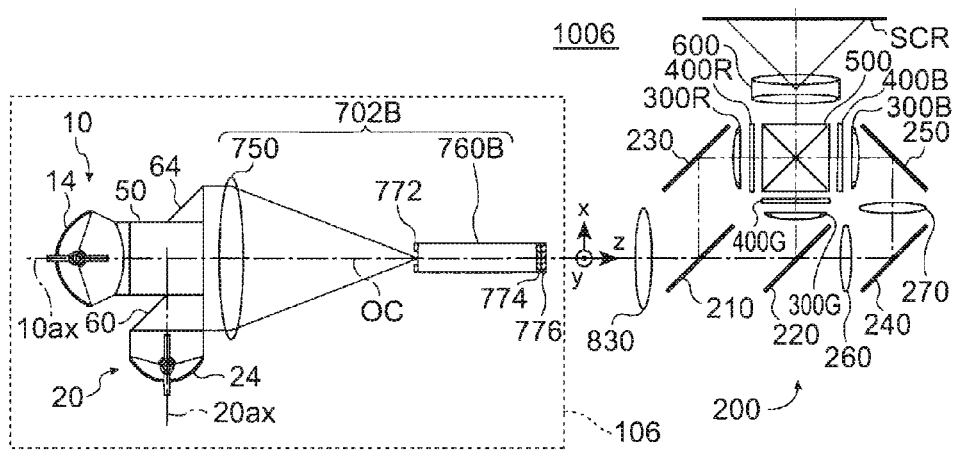
FIGS. 9A to 9C are views illustrating an illuminating device 106 and a projector 1006, according to Embodiment 4.
Figure 9B:
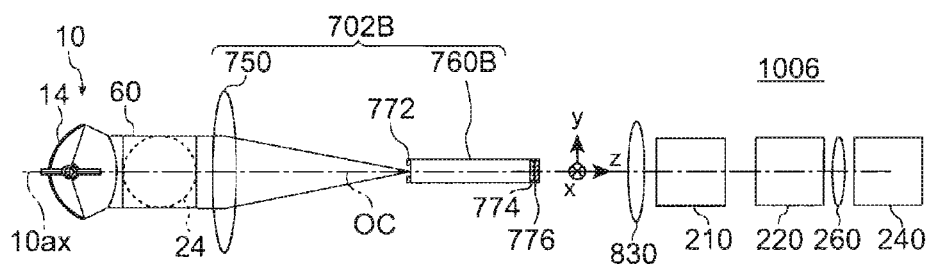
Figure 9C:
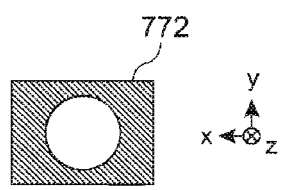

FIGS. 9A to 9C is a view illustrating an illuminating device 106 and a projector 1006, according to Embodiment 4. FIG. 9A is a plan view showing an optical system of the projector 1006, FIG. 9B is a side view showing the optical system of a projector 1006, and FIG. 9C is a view of the light incidence surface of an integrator rod 760B as seen along the system optical axis OC. In addition, in FIGS. 9A and 9B, the same members as those of FIGS. 1 and 8 are denoted by the same reference numerals, and detailed description thereof is omitted.

Although the illuminating device 106 according to Embodiment 4 has a configuration similar to the illuminating device 100 according to Embodiment 1, it is different from the illuminating device 100 according to Embodiment 1 in terms of the configuration of an integrator optical system.

Specifically, in the illuminating device 106 according to Embodiment 4, as shown in FIGS. 9A and 9B, the integrator optical system 702B has a condensing lens 750 which converts into converging light the illumination beams emitted from the first light source unit 10 and the illumination beams emitted from the second light source unit 20 and reflected by the reflecting prisms 60 and 64, an integrator rod 760B which converts the illumination beams from the condensing lens 750 into light having more uniform intensity distribution, and a reflecting layer 772 arranged on the side of the light incidence surface of the integrator rod 760B and having an opening for light incidence in a central portion thereof, a $\lambda/4$ plate 774 arranged on the side of the light emission surface of the integrator rod 760B, and a reflective polarizing plate 776 arranged on the light emission side of the $\lambda/4$ plate 774.

The integrator rod 760B is an optical element having a function to perform multiple reflection of the light from the condensing lens 750 therein to convert the light from the condensing lens 750 into light having more uniform intensity distribution. As the integrator rod 760B, for example, a solid glass rod can be used preferably.

The shape of the light emission surface of the integrator rod 760B is set so as to make a shape almost similar to the shape of the image formation regions of the liquid crystal devices 400R, 400G, and 400B.

In addition, a relay lens 830 which guides the illumination beams from the illuminating device 106 is arranged at the latter stage of the optical path of the illuminating device 106. The relay lens 830 has a function to form an image in the vicinity of the image formation regions of the condensing lenses 300R, 300G, and 300B without causing the illumination beams from the illuminating device 106 to diverge, along with the condensing lenses 300R, 300G, and 300B. In addition, although the relay lens 830 shown in FIGS. 9A and 9B is composed of one lens, it may be composed of a compound lens obtained by combining a plurality of lenses.

As such, the illuminating device 106 according to Embodiment 4 is different from the illuminating device 100 according to Embodiment 1 in terms of the configuration of the integrator optical system. However, the illumination device 106 has the same configuration as the illuminating device 100 according to Embodiment 1 in terms of other points. Therefore, similarly to the illuminating device 100 according to Embodiment 1, a high-luminance and compact illuminating device capable of making the light utilization efficiency higher than before can be obtained.

Moreover, in the illuminating device 106 according to Embodiment 4, as shown in FIGS. 9A to 9C, the integrator optical system 702B further has the reflecting layer 772 arranged on the light incidence side of the integrator rod 760B and having the opening for light incidence in the central portion thereof, the $\lambda/4$ plate 774 arranged on the side of the light emission surface of the integrator rod 760B, and the reflective polarizing plate 776 arranged on the side of the light emission surface of $\lambda/4$ plate 774.

Accordingly, in a case where illumination beams relating to one polarization component (for example, S polarization component), among the illumination beams which have entered the integrator rod 760B, pass through the reflective polarizing plate 776, and illumination beams relating to another polarization component (for example, P polarization component) are reflected by the reflective polarizing plate 776. This reflected light is reflected by the reflecting layer 772 arranged on the side of the light incidence surface of the integrator rod 760B, and reaches the reflective polarizing plate 776 again. At this time, since this light has already passed through the λ/4 plate 774 twice, the light rotates in the polarizing direction by 90 degrees and pass through the reflective polarizing plate 776 as illumination beams according to one polarization component. That is, it is possible to align the polarizing direction of the light emitted from the integrator rod 760B with substantially one kind of polarizing direction. Accordingly, the illuminating device is especially suitable for a projector using an electro-optical modulator which controls the polarizing direction like a liquid crystal device.

Since the illuminating device 106 according to Embodiment 4 has the same configuration as the illuminating device 100 according to Embodiment 1 in terms of other points than the configuration of the integrator optical system, it has the same effects as the illuminating device 100 according to Embodiment 1.

Since the projector 1006 according to Embodiment 4 has the above-mentioned illumination device 106, it becomes a high-luminance and compact projector capable of making the light utilization efficiency higher than before.

Embodiment 5

Figure 10A:
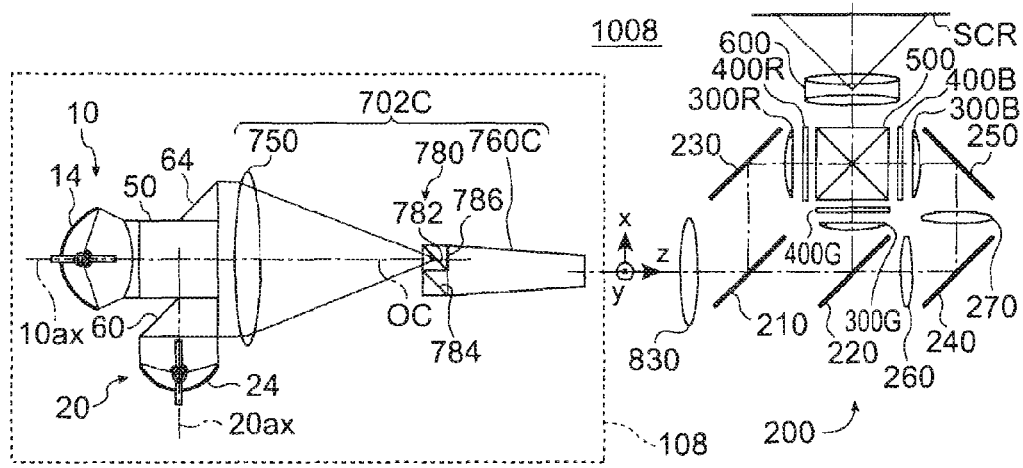
FIGS. 10A to 10C are views illustrating an illuminating device 108 and a projector 1008, according to Embodiment 5.
Figure 10B:
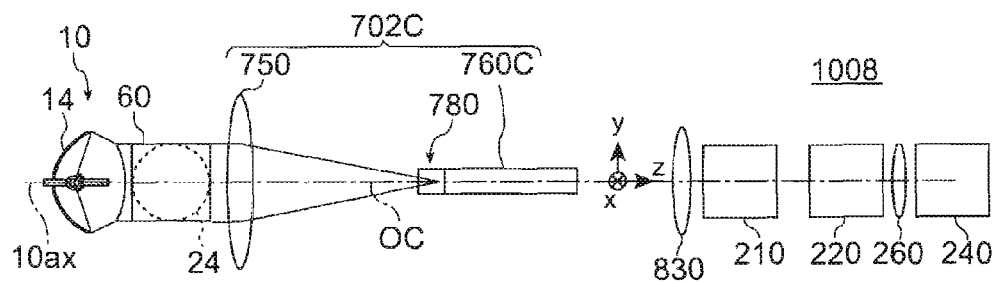
Figure 10C:
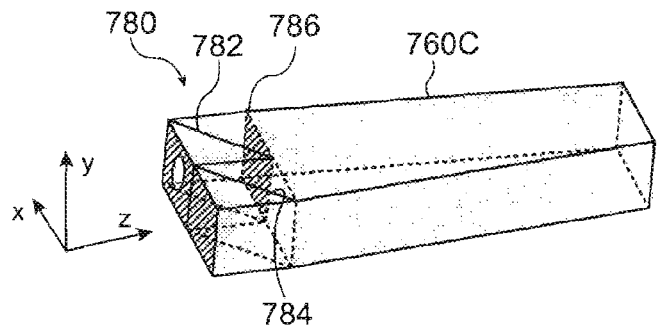

FIGS. 10A to 10C are views illustrating an illuminating device 108 and a projector 1008, according to Embodiment 5, FIG. 10A is a plan view showing an optical system of the projector 1008, FIG. 10B is a side view showing the optical system of a projector 1008, and FIG. 10C is a perspective view of a polarized light converting element 780 and an integrator rod 760C. In addition, in FIGS. 10A and 10B, the same members as those of FIGS. 1 and 9 are denoted by the same reference numerals, and detailed description thereof is omitted.

Although the illuminating device 108 according to Embodiment 5 has a configuration similar to the illuminating device 106 according to Embodiment 4, it is different from the illuminating device 106 according to Embodiment 4 in terms of the configuration of an integrator optical system.

The illuminating device 108 according to Embodiment 5, as shown in FIGS. 10A to 10C, has a condensing lens 750 which converts into converging light the illumination beams emitted from the first light source unit 10 and the illumination beams emitted from the second light source unit 20 and reflected by the reflecting prisms 60 and 64 and emits the converted light, a polarized light converting element 780 which converts the illumination beams from the condensing lens 750 into beams having substantially one kind of linearly-polarized light component, and an integrator rod 760C which converts the illumination beams from the polarized light converting element 780 into light having more uniform intensity distribution.

The polarized light converting element 780 has a polarized light separating surface 782 which transmits one linearly polarized light component (for example, P polarization component) of the polarization components included in the illumination beams from the condensing lens 750 as it is, and reflects the other linearly polarized light component (for example, S polarization component) in the direction (x-axis direction) perpendicular to the system optical axis OC, a reflecting surface 784 which reflects the other linearly polarized light component reflected by the polarized light separating surface 782 in the direction (z-axis direction) parallel to the system optical axis OC, and a λ/2 plate 786 as a phase plate which converts the one linearly polarized light component transmitted through the polarized light separating surface 782 into the other linearly polarized light component.

In addition, the polarized light converting element 780 can also switch the polarized light separating surface 782 which transmits an illumination beam relating to a P polarization component and reflects an illumination beam relating to an S polarization component to another polarized light separating surface which transmits an illumination beam relating to an S polarization component and reflects an illumination beam relating to a P polarization component.

The integrator rod 760C is an optical element having a function to perform multiple reflection of the light from the polarized light converting element 780 therein to convert the light from the polarized light converting element 780 into light having more uniform intensity distribution. As the integrator rod 760C, for example, a solid glass rod can be used preferably.

The shape of the light emission surface of the integrator rod 760C is set so as to make a shape almost similar to the shape of the image formation regions of the liquid crystal devices 400R, 400G, and 400B.

As such, the illuminating device 108 according to Embodiment 5 is different from the illuminating devices 100 and 106 according to Embodiments 1 and 4 in terms of the configuration of the integrator optical system. However, the illumination device 108 has the same configuration as the illuminating devices 100 and 106 according to Embodiments 1 and 4 in terms of other points. Therefore, similarly to the illuminating devices 100 and 106 according to Embodiments 1 and 4, a high-luminance and compact illuminating device capable of mailing the light utilization efficiency higher than before can be obtained.

Moreover, in the illuminating device 108 according to Embodiment 5, the integrator optical system 702C further has the polarized light converting element 780 which is arranged on the light incidence side of the integrator rod 760C to convert the illumination beams from the condensing lens 750 into beams having substantially one kind of linearly polarized light component. Accordingly, since the polarizing direction of illumination beams entering the integrator rod 760C is aligned with substantially one kind of polarizing direction, the illumination device will be especially suitable for a projector using an electro-optical modulator which controls a polarizing direction like a liquid crystal device.

Moreover, in the illuminating device 108 according to Embodiment 5, as shown in FIGS. 10A to 10C, the integrator rod 760C and the polarized light converting element 780 are adhered together with adhesive having the same refractive index as the integrator rod 760C and the polarized light converting element 780. Therefore, undesirable multiple reflection between the polarized light converting element 780 and the integrator rod 760C is suppressed. As a result, a decrease in the light utilization efficiency or a rise in a stray light level is prevented. Moreover, the polarized light converting element 780 and the integrator rod 760C can be integrated easily. Moreover, occurrence of a positional deviation after assembling of an apparatus between the polarized light converting element 780 and the integrator rods 760C can be prevented in advance.

Since the illuminating device 108 according to Embodiment 5 has the same configuration as the illuminating devices 100 and 106 according to Embodiments 1 and 4 in terms of other points than the configuration of the integrator optical system, it has the same effect as the illuminating devices 100 and 106 according to Embodiments 1 and 4.

Since the projector 1008 according to Embodiment 5 has the above-mentioned illumination device 108, it becomes a high-luminance and compact projector capable of making the light utilization efficiency higher than before.

As described above, although the illuminating device and projector of the embodiments of the invention have been described on the basis of the above respective embodiments, the invention is not limited to the above respective embodiments, and can be implemented in various aspects without departing from the spirit and scope thereof. For example, the following modifications can also be made.

(1) In the illuminating devices 100 to 108 of the above respective embodiments, a light source unit composed of an ellipsoidal reflector and a concave lens is used as the first light source unit 10, and a light source unit composed of a parabolic reflector is used as the second light source unit 20. However, the invention is not limited thereto. A light source unit composed of a parabolic reflector can also be used as the first light source unit, and a light source unit composed of an ellipsoidal reflector and a concave lens can also be used as the second light source unit.

(2) In the illuminating devices 100 to 108 of the above respective embodiments, a secondary mirror is used as the reflecting section disposed in the light-emitting tube. However, the invention is not limited thereto, and a reflecting film is also preferably used as the reflecting section. Moreover, in the illuminating devices 100 to 108 of the above respective embodiments, the illuminating device in which a secondary mirror as the reflecting section is disposed in the light-emitting tube is illustratively described. However, the invention is not limited thereto, and the invention can also be applied to an illuminating device in which the secondary mirror is not disposed.

(3) In the illuminating devices 104 to 108 according to the above embodiments 3 to 5, an inner surface total reflection type solid glass rod is used as the integrator rod. However, the invention is not limited thereto. For example, a hollow rod, such as a tubular light tunnel, in which four reflecting mirrors are pasted together with their reflecting surfaces turned towards the inside.

(4) In the illuminating devices 100, 104 to 108 according to the above-mentioned embodiment 1, and 3 to 5, the case where the translucent member 50, the reflecting prisms 60 and 64, the concave lens 18, and the first lens array 710 are adhered together via adhesion layers, respectively, is illustratively described. However, the invention is not limited thereto, and these members may be arranged such that they are spaced apart from one another.

(5) In the illuminating devices 100 to 108 of the above respective embodiments, the case where the translucent member 50 is arranged in an optical path of the illumination beams from the first light source unit 10 between the two reflecting prisms 60 and 64 or in the optical path of the illumination beams from the first light source unit 10 between the two reflecting mirrors 80 and 82 is illustratively described. However, the invention is not limited thereto and the translucent member may not be arranged.

(6) In the above respective embodiments, the configuration (combination) of the reflecting elements can be changed appropriately. For example, in the illuminating device 100 according to Embodiment 1, the reflecting prism 60 on the side of the second light source unit 20 may be replaced with a configuration using the reflecting mirror 80 described in Embodiment 2.

(7) In the projectors 1000, 1006, and 1008 according to the above Embodiments 1, 4, and 5, the liquid crystal devices 400R, 400G, and 400B of which the image formation regions have a rectangular planar shape "short side:long side=3:4" are used as liquid crystal devices. The invention is not limited thereto and liquid crystal devices for wide vision of which the image formation regions have a rectangular planar shape of "short side:long side=9:16." In this case, as the first lens array, it is preferable to use a lens array composed of three lens arrays including a lens array arranged in the optical path of the illumination beams from the first light source unit 10 and having first small lenses arrayed in a matrix of seven rows and four columns in a plane perpendicular to the z-axis direction, a lens array arranged in the optical path of the illumination beams reflected by the reflecting prism 60 and having the first small lenses arrayed in a matrix of seven rows and two columns in the plane perpendicular to the z-axis direction, and a lens array arranged in the optical path of the illumination beams reflected by the reflecting prism 64 and having the first small lenses arrayed in a matrix of seven rows and two columns in the plane perpendicular to the z-axis direction.

(8) Although the projectors 1000, 1006, and 1008 according to the above Embodiments 1, 4, and 5 are transmissive projectors, the invention is not limited thereto. The invention can also be applied to a reflective projector. The term "transmissive" means a type in which an electro-optical modulator as a light modulation means transmits light like a transmissive liquid crystal device, and the term "reflective" means a type in which an electro-optical modulator as a light modulation means reflects light like a reflective liquid crystal device. Even in a case where the invention is applied to the reflective projector, the same effects as the transmissive projector can be obtained.

(9) In the projectors 1000, 1006, and 1008 according to the above Embodiments 1, 4, and 5, the projector using the liquid crystal devices 400R, 400G, and 400B is illustratively described. However, the invention is not limited thereto, and can also be applied to projectors using one liquid crystal device, two liquid crystal devices, or four or more liquid crystal devices.

(10) In the projector 1004 according to the above Embodiment 3, the projector using one macro-mirror-type modulator 410 is illustratively described. However, the invention is not limited thereto, and can also be applied to projectors using a plurality of micro-mirror-type modulators.

(11) In the projector 1004 according to the above Embodiment 3, the color wheel 810 is arranged on the light emission side of the integrator rod 760, the invention is not limited thereto, and the color wheel may be arranged on the light incidence side of the integrator rod.

(12) The invention can also be applied to a front projection type projector which projects a projection image from the observation side, and can also be applied to a rear projection type projector which projects a projection image from the side opposite to the observation side.

Further, while this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

The priority applications Numbers JP2006-123039 upon which this patent application is based is hereby incorporated by reference.

What is claimed is:

1. A projector comprising:
an illuminating device, the illuminating device further including:
a first light source unit having an ellipsoidal reflector, a first light-emitting tube having an emission center in the vicinity of a first focal point of the ellipsoidal reflector, a first reflecting section reflecting the light emitted towards an illuminated region from the first light-emitting tube towards the first light-emitting tube, and a concave lens emitting the converging light from the ellipsoidal reflector as substantially parallel beams, the first light source unit emitting illumination beams with a first optical axis as a central axis;
a second light source unit having a parabolic reflector, a second light-emitting tube having an emission center in the vicinity of a focal point of the parabolic reflector, and a second reflecting section reflecting the light emitted towards the illuminated region from the second light-emitting tube towards the second light-emitting tube, the second light source unit emitting illumination beams with a second optical axis as a central axis;
two reflecting elements arranged on both sides of an optical path of the illumination beams from the first light source unit so as transmit the illumination beams from the first light source unit as they are without reflecting them and so as to reflect the illumination beams from the second light source unit towards a direction along the first optical axis;
an integrator optical system having a function to convert the illumination beams from the first light source unit and the illumination beams emitted from the second light source unit and reflected by the two reflecting elements into light having more uniform intensity distribution, the integrator optical system further including:
a condensing lens that converts into converging light the illumination beams emitted from the first light source unit and the illumination beams emitted from the second light source unit and reflected by the two reflecting elements and emits the converted light;
an integrator rod that converts the illumination beams from the condensing lens into light having more uniform intensity distribution;
a reflecting layer arranged on a light incidence surface of the integrator rod, the reflecting layer having an opening for light incidence arranged in a central portion thereof;
a λ/4 plate; and
a reflective polarizing plate,
the λ/4 plate and the reflective polarizing plate being arranged in this order along a traveling direction of light on the side of a light emission surface of the integrator rod;
an electro-optical modulator modulating the light from the illuminating device according to image information; and
a projection optical system projecting the light modulated by the electro-optical modulator,
wherein the reflecting element of the two reflecting elements arranged on the side of the second light source unit reflects the illumination beams emitted from a substantially half region on one side in an aperture plane of the parabolic reflector, among the illumination beams emitted from the second light source unit, towards the direction along the first optical axis, and the reflecting element of the two reflecting elements arranged opposite to the second light source unit reflects the illumination beams emitted from a substantially half region on the other side in the aperture plane of the parabolic reflector, among the illumination beams emitted from the second light source unit, towards the direction along the first optical axis.

2. The projector according to claim 1, further comprising:
a translucent member arranged in the optical path of the illumination beams from the first light source unit between the two reflecting elements.

3. The projector according to claim 1,
wherein the two reflecting elements are reflecting prisms or reflecting mirrors.

4. The projector according to claim 1,
wherein the integrator optical system includes:
a polarized light converting element arranged on the light incidence side of the integrator rod to convert the illumination beams from the condensing lens into beams having substantially one kind of linearly polarized light component.

5. A projector comprising:
an illuminating device, the illuminating device further including:
a first light source unit having an ellipsoidal reflector, a first light-emitting tube having an emission center in the vicinity of a first focal point of the ellipsoidal reflector, a first reflecting section reflecting the light emitted towards an illuminated region from the first light-emitting tube towards the first light-emitting tube, and a concave lens emitting the converging light from the ellipsoidal reflector as substantially parallel beams, the first light source unit emitting illumination beams with a first optical axis as a central axis;
a second light source unit having a parabolic reflector, a second light-emitting tube having an emission center in the vicinity of a focal point of the parabolic reflector, and a second reflecting section reflecting the light emitted towards the illuminated region from the second light-emitting tube towards the second light-emitting tube, the second light source unit emitting illumination beams with a second optical axis as a central axis;
two reflecting elements arranged on both sides of an optical path of the illumination beams from the first light source unit so as transmit the illumination beams from the first light source unit as they are without reflecting them and so as to reflect the illumination beams from the second light source unit towards a direction along the first optical axis;
an integrator optical system having a function to convert the illumination beams from the first light source unit and the illumination beams emitted from the second light source unit and reflected by the two reflecting elements into light having more uniform intensity distribution, the integrator optical system further including:
a first lens array having a plurality of first small lenses, the first lens array splitting the illumination beams from the first light source unit and the illumination beams emitted from the second light source unit and reflected by the two reflecting elements into a plurality of partial beams;
a second lens array having a plurality of second small lenses corresponding to the first small lenses, respectively;

a polarized light converting element that converts the partial beams from the second lens array into beams having substantially one kind of linearly polarized light component; and a superposition lens that superposes the light from the polarized light converting element in the illuminated region, wherein the first lens array and the second lens array include:

a lens array arranged in an optical path of the illumination beams from the first light source unit and split into four columns in a direction along the direction of a long side of each of the first small lenses or each of the second small lenses;

a lens array arranged in an optical path of the illumination beams reflected by a reflecting element arranged on the side of the second light source unit and split into two columns in a direction along the direction of a long side of each of the first small lenses or each of the second small lenses; and a lens array arranged in an optical path of the illumination beams reflected by a reflecting element arranged opposite to the second light source unit and split into two columns in a direction along the direction of a long side of each of the first small lenses or each of the second small lenses;

an electro-optical modulator modulating the light from the illuminating device according to image information; and a projection optical system projecting the light modulated by the electro-optical modulator, wherein the reflecting element of the two reflecting elements arranged on the side of the second light source unit reflects the illumination beams emitted from a substantially half region on one side in an aperture plane of the parabolic reflector, among the illumination beams emitted from the second light source unit, towards the direction along the first optical axis, and the reflecting element of the two reflecting elements arranged opposite to the second light source unit reflects the illumination beams emitted from a substantially half region on the other side in the aperture plane of the parabolic reflector, among the illumination beams emitted from the second light source unit, towards the direction along the first optical axis, the integrator optical system includes.

6. The projector according to claim 5, further comprising: a translucent member arranged in the optical path of the illumination beams from the first light source unit between the two reflecting elements.

7. The projector according to claim 5, wherein the two reflecting elements are reflecting prisms or reflecting mirrors.

* * * * *